United States Patent Office 3,273,017
Patented Sept. 13, 1966

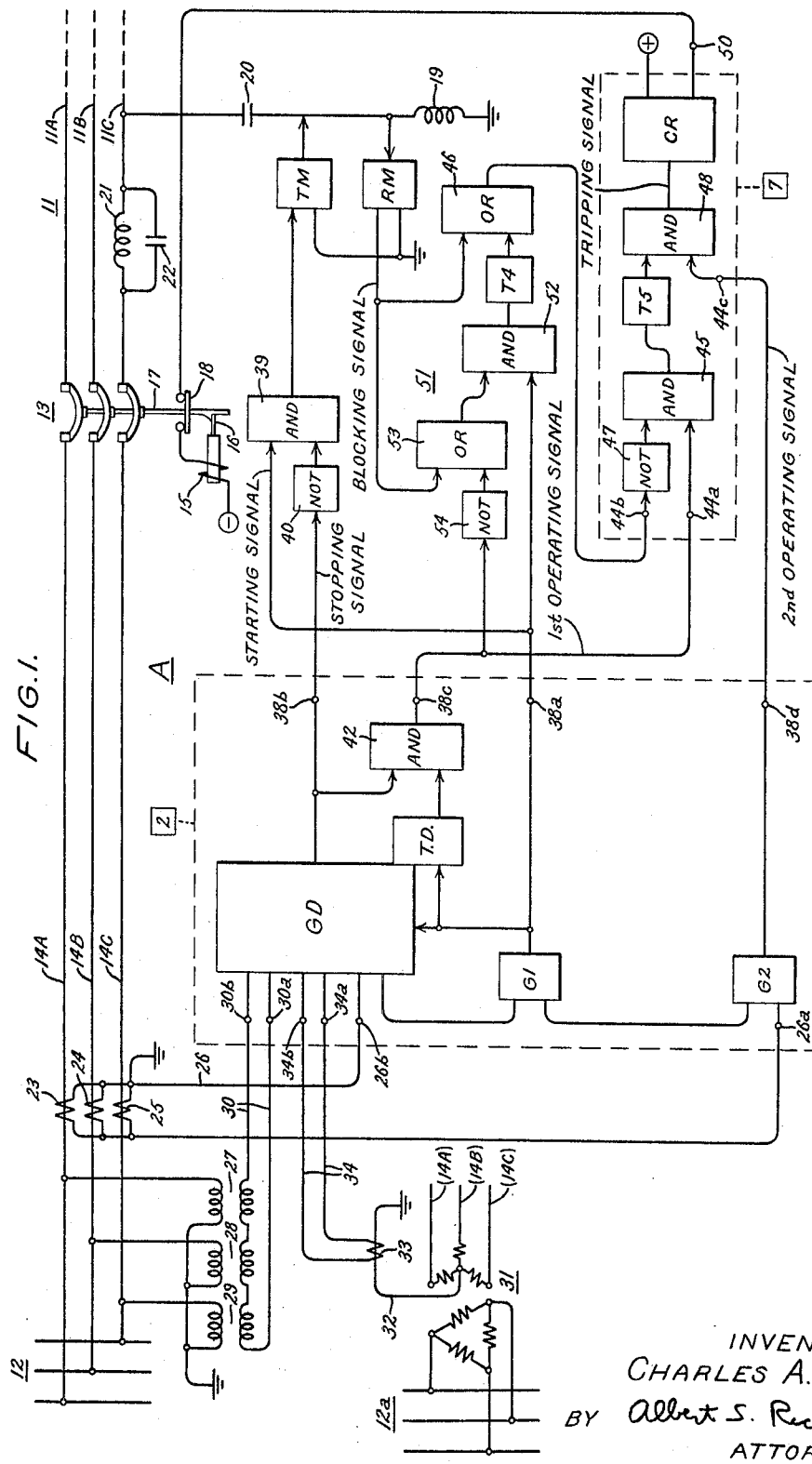

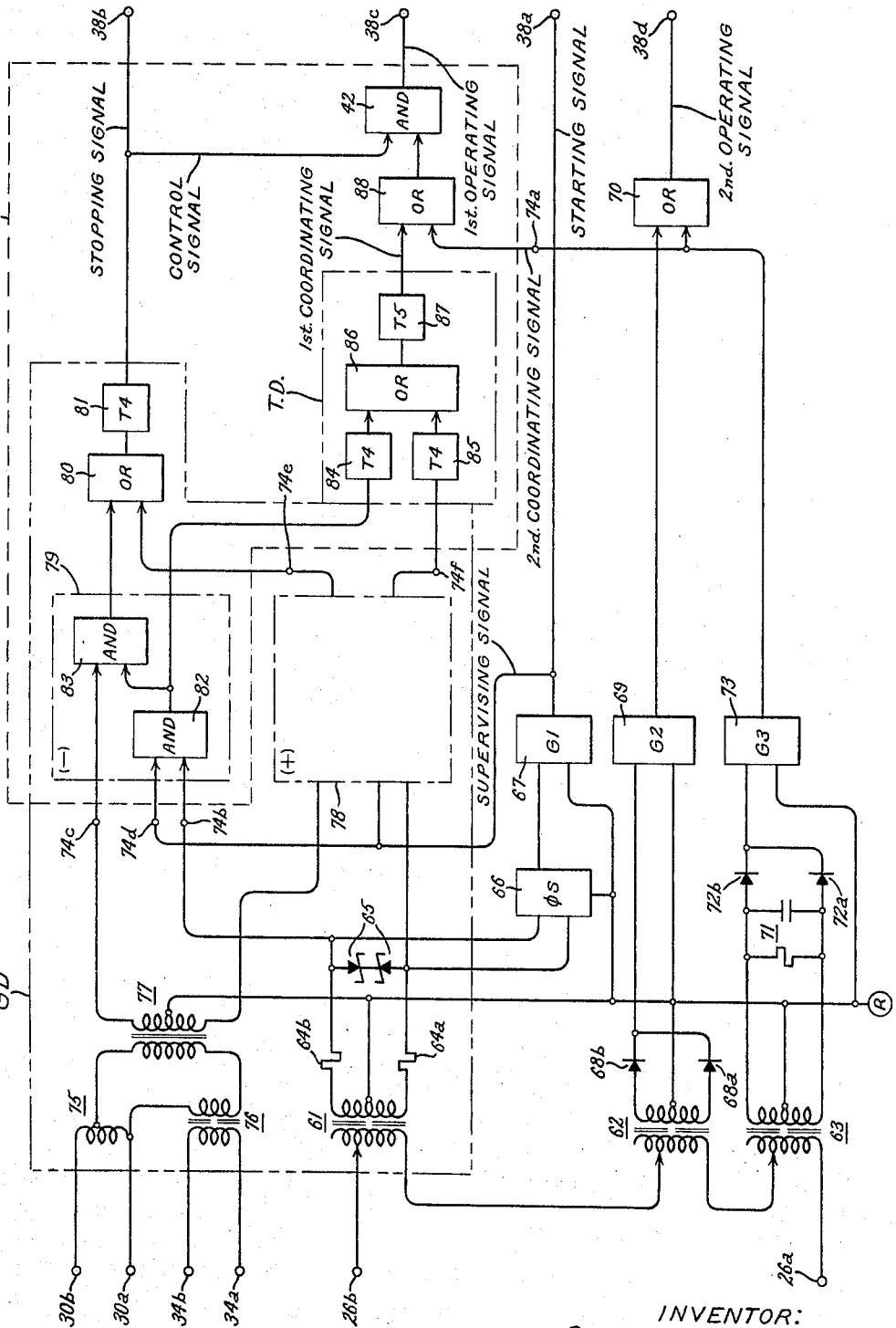

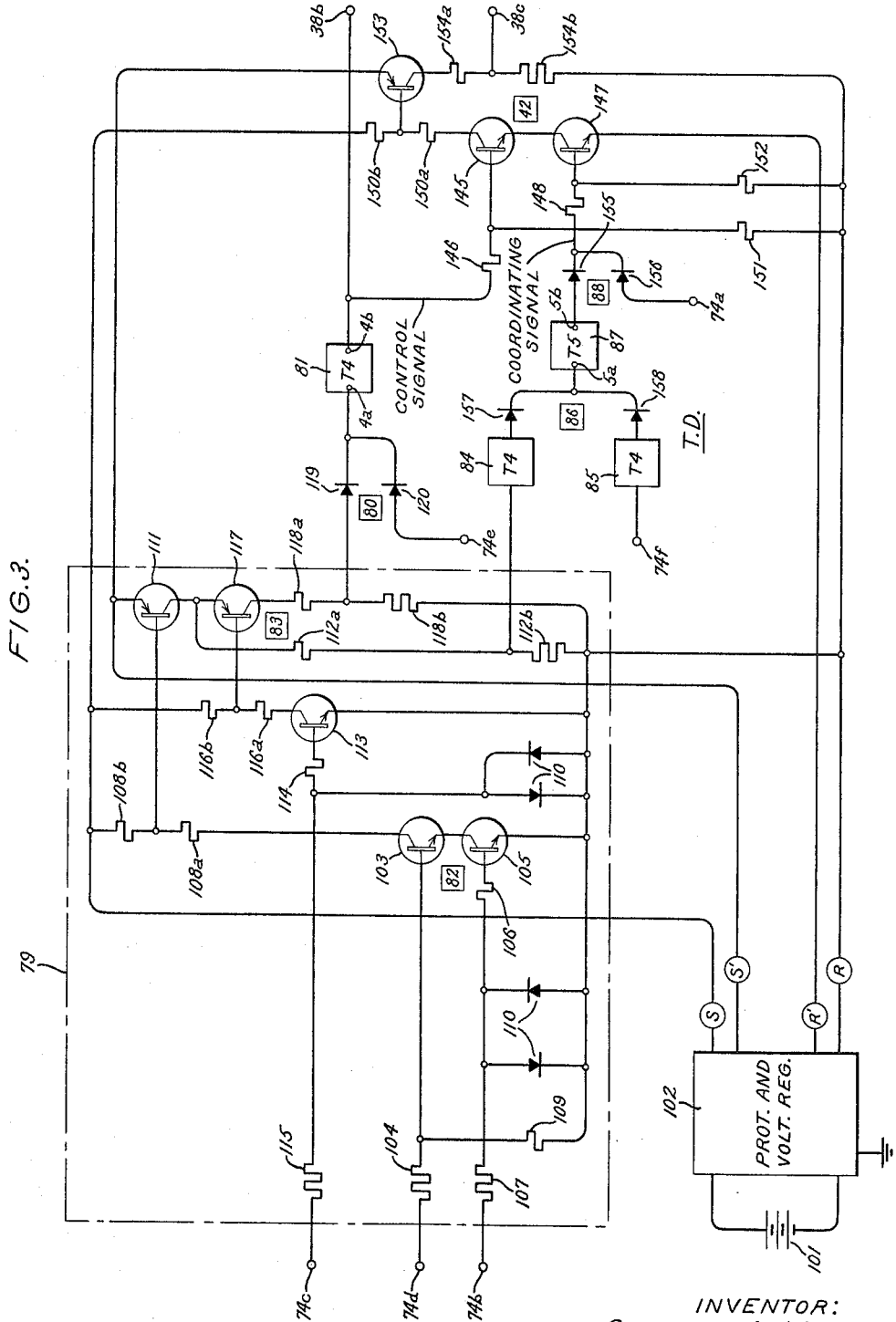

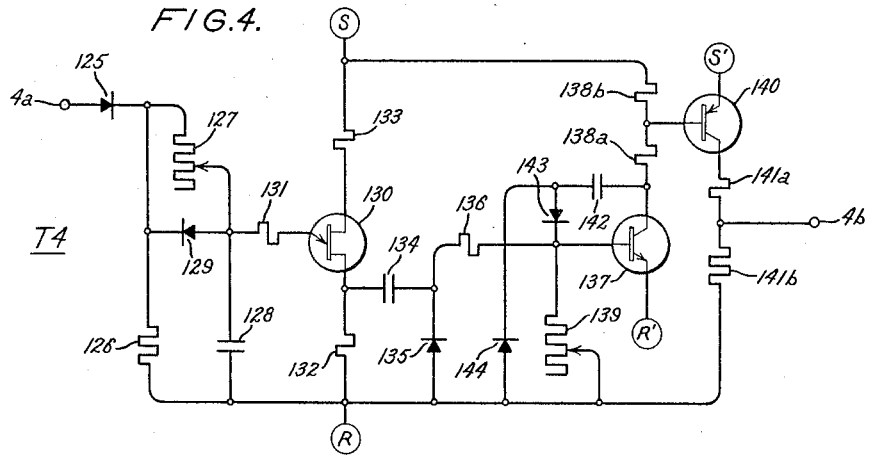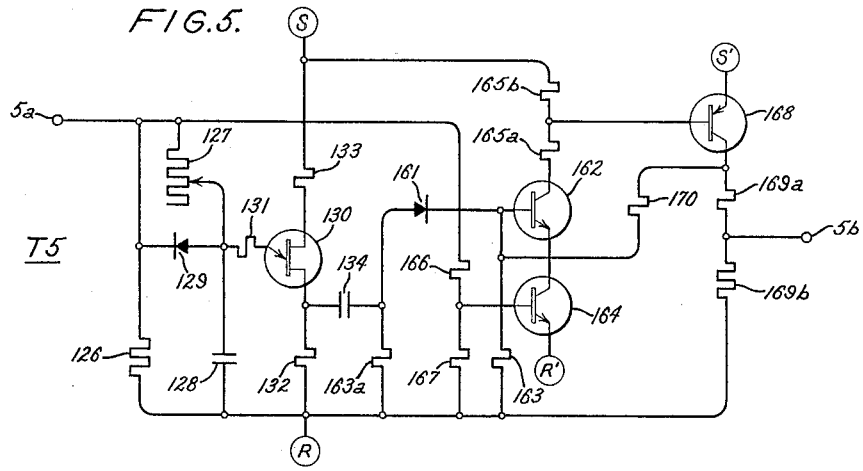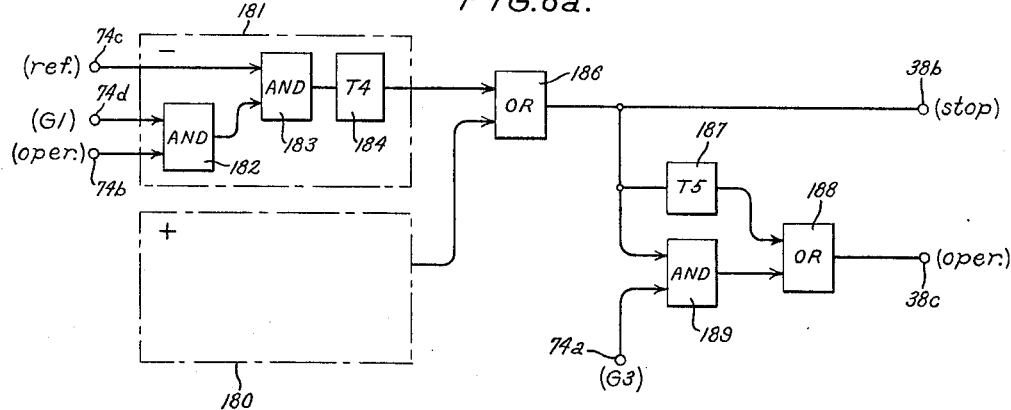

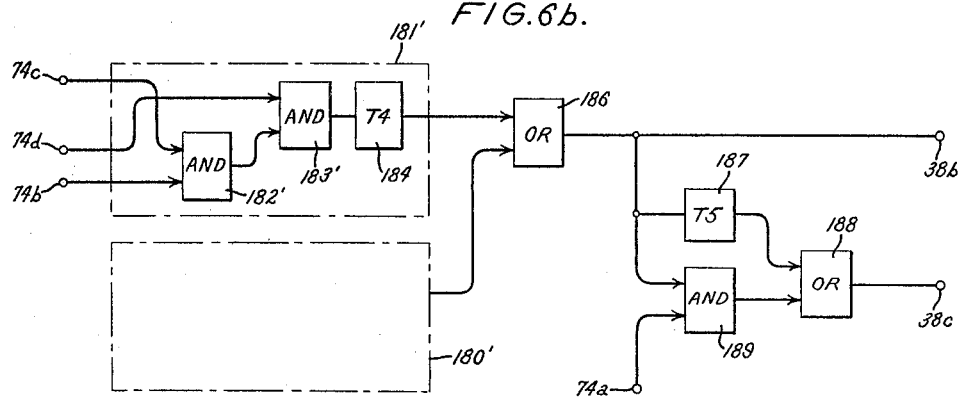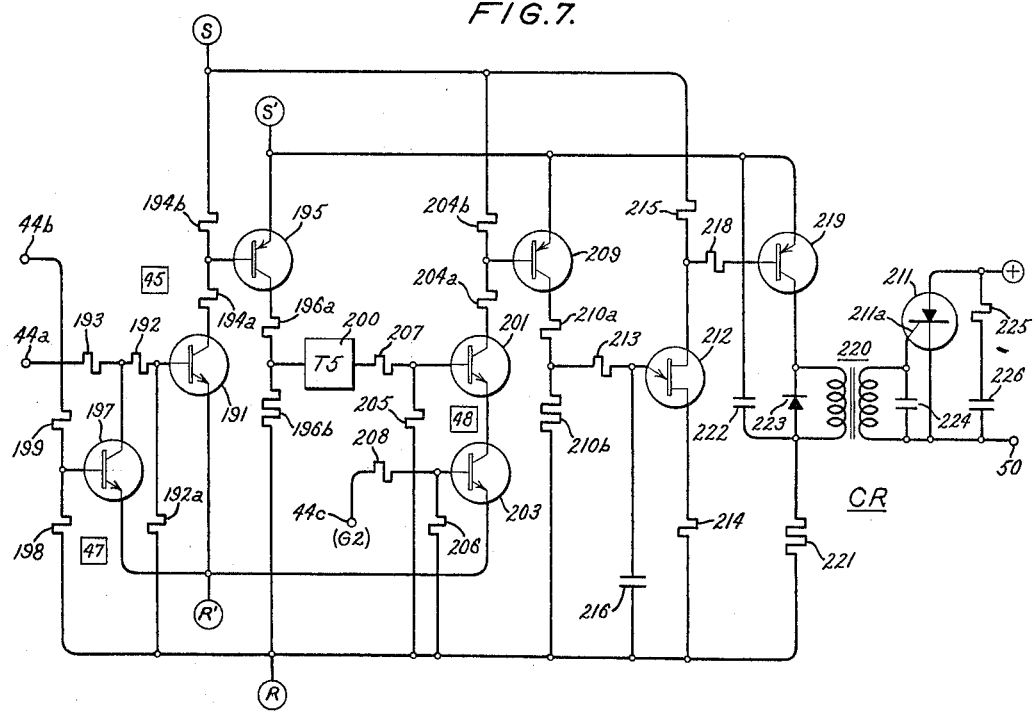

3,273,017
GROUND FAULT RESPONSIVE DIRECTIONAL COMPARISON PROTECTIVE SYSTEM FOR AN ELECTRIC POWER TRANSMISSION LINE
Charles A. Mathews, Springfield, Pa., assignor to General Electric Company, a corporation of New York
Filed Jan. 7, 1963, Ser. No. 249,791
21 Claims. (Cl. 317—18)

This invention relates to a ground fault responsive protective system for an electric power transmission line, and more particularly it relates to a high-speed directional-comparison pilot type transmission line protective relaying system adapted to employ "static" circuit components.

Fast operation, maximum reliability and security, and minimum maintenance are well known objectives of protective relaying designers. In furtherance of these interrelated goals, a good deal of attention is currently being given to the application of semiconductor technology in the art of protective relaying. The present invention is related to this effort. It is a general objective of my invention to provide an improved directional comparison protective system in which transistors and other semiconductor or "static" devices can be used to advantage. But while the distinctive characteristics and attributes of such static devices are contemplated in the preferred embodiment of my system, it will be apparent hereinafter that the invention is not limited to the exclusive use of these particular components.

A more specific objective of the present invention is the provision of a high-voltage transmission line ground current directional comparison protective relaying system which is capable of more sensitive and accurate and even faster operation than the prior art system disclosed and claimed in U.S. Patent No. 2,879,453 granted on March 24, 1959, to M. E. Hodges et al.

The function of any fault responsive directional-comparison protective relaying system is to initiate the simultaneous opening or tripping of high-speed circuit interrupters, which are located at the respective ends or terminals of an electric power line being protected by the relaying system, in quick response to a fault or short circuit occurring on the protected line. Of course, this operation should not take place in the event of an "external" fault, i.e. one occurring at some point in the power system beyond a terminal of the protected line. The intended function is accomplished by providing at each terminal of the line appropriate fault detecting and directional sensing means arranged to operate in response to fault current flowing into the protected line, by comparing the operative state of said means at the respective terminals, and by initiating tripping only if this comparison reveals "in-flowing" current at every one of said terminals.

In order to make this directional comparison, it is necessary to interconnect the different terminals of the protected line by means of a pilot channel which can communicate appropriate intelligence therebetween. A variety of methods of obtaining the desired intercommunication are known, including in high-voltage transmission line relaying practice the use of carrier current of microwave transmission wherein a high-frequency continuous signal transmitted at each line terminal is instantly received at all other terminals. This signal is utilized to prevent or block tripping of the circuit interrupter located at each receiving terminal. The intended protective function is then accomplished by arranging the relaying system to operate specifically as follows: signal transmission is started at all terminals in high-speed response to the incidence of a fault (whether external or internal); subsequently this transmission is stopped at each terminal whose directional sensing means "sees" line current flowing toward a fault on the protected-line side of that terminal; the directional sensing means additionally attempts to trip the local circuit interrupter under like conditions; but tripping is not permitted unless signal transmission stops at every terminal, indicating agreement by all of the directional sensing means that the fault is in fact internal.

As has been heretofore recognized, there are certain circumstances where momentary power system disturbances may cause improper operation of a directional-comparison protective relaying system. One possible source of disturbances of this kind is the sequential clearing of an external fault located on a line parallel to the protected line. In order to prevent misoperation under this circumstance, it is conventional practice to provide a "transient blocking function" which temporarily disables the relaying system after sufficient time has elapsed to permit its proper operation in response to any true internal fault, and for a limited time delay thereafter. A further object of the present invention is the provision of improved means for obtaining a transient blocking function in a high-speed directional-comparison protective system adapted to be used with a microwave pilot channel.

When a directional-comparison protective relaying system is meant to respond to ground faults on a polyphase A.-C. electric power transmission line, it is common practice to couple its fault detecting and directional sensing means to the line by way of the residual or neutral circuit of star-connected instrument current transformers. The relaying components are then responsive to the zero-phase-sequence component of line current which accurately reflects any electric imbalance in the power system caused by a ground fault thereon. But zero-phase-sequence line current may also be produced under certain non-fault conditions. More specifically, such a condition may exist during the closing operation of the circuit interrupter last closed (or reclosed) on the protected line. This was recognized by Hodges et al. in their Patent 2,879,453 referred to hereinbefore.

When a multipole high-voltage power circuit interrupter closes, all of its poles are not likely to make contact at the identical instant of time. If this uneven or sequental pole closure occurs, momentary unbalanced load current can flow which may falsely appear to the relaying system as an internal ground fault. Even the worst unequal pole closing interval is, however, relatively brief (ordinarily less than one-half cycle on a 60 cycles per second basis), and hence the possibility of false operation by this cause becomes relatively significant only when designing ultrahigh-speed ground fault responsive protective relaying systems such as contemplated herein. Accordingly, therefore, it is another object of the present invention to provide a high-speed ground current directional-comparison protective system which will not falsely respond to unbalanced line currents caused by sequential pole closure.

Another possible source of false operation is transient line charging current which flows when a high-voltage transmission line is first energized. The initial application of electric power to a previously "dead" line will result in transient line-energizing or "charging" current of relatively high frequency (at least three times the fundamental power frequency in a polyphase A.-C. system), as each of the respective line conductors attains its rated potential difference with respect to the other conductors and to ground. This phenomenon may adversely affect proper operation of the ground fault current directional sensing means, and it may cause malfunctioning of the means which is provided to prevent false operation of the relaying system during an unequal pole closing interval. Accordingly, still another object of my invention is the provision of a high-speed, secure ground fault responsive directional-comparison protective system which is immune to transient line-energizing current.

It is another object of this invention to provide a reliable and secure protective relaying arrangement of the character described, wherein unusually sensitive and high-speed operation is obtainable.

In carrying out my invention in one form, I provide a directional-comparison protective relaying system for initiating a predetermined control function, such as tripping circuit interrupters, in high-speed response to the occurrence of a ground fault on a polyphase A.-C. electric power transmission line. The protected line is isolated by the circuit interrupters which are located at distantly spaced terminals of the line, and each terminal is equipped with a signal transmitter and receiver. These signal transmitters and receivers are so arranged that the transmitter at each terminal can communicate when active with the receiver at any other line terminal remote therefrom.

My protective system comprises the following cooperating relaying components for each of the line terminals: first and second ground fault detectors, a sensitive ground current directional sensing means, and first and second control means. The first fault detector is arranged to activate the local transmitter when the magnitude of the zero-phase-sequence component of line current exceeds a predetermined first amount (which indicates that a ground fault has occurred somewhere on the power system). The directional sensing means operates in response to zero-phase-sequence line current flowing toward a ground fault on the protected-line side of the local terminal, and it is connected by way of the first control means to the associated transmitter for deactivating the same upon operation thereof. In accordance with a first aspect of my invention, I so interconnect the first fault detector and the directional sensing means that the latter is operative only when the magnitude of zero-phase-sequence current is in excess of the aforesaid first amount.

The second one of the fault detectors will operate whenever the magnitude of zero-phase-sequence line current exceeds a predetermined second amount which is greater than the aforesaid first amount. The second control means is connected to both the directional sensing means and the second fault detector, and it is capable of initiating the desired control function in response to the contemporaneous operations of these two components. It also cooperates with the local receiver so as to be ineffective to initiate the control function while said receiver is receiving a communicative signal from an active remote transmitter. Hence the predetermined control signal can be initiated only if there is agreement at all terminals that a ground fault to which the second fault detector responds is located in an "internal" direction.

In another aspect of the invention, false response during sequential pole closure of the last-closed circuit interrupter is avoided by providing, in conjunction with the first fault detector and the directional sensing means at each line terminal, time delay means for preventing activation of the second control means on the inception of a ground fault and for a predetermined minimum time interval thereafter. In order to permit fast operation of the relaying system in the event of an internal ground fault, this time delay is only lightly longer than the relatively short period of possible current unbalance due to unequal pole closing. In order to avoid premature expiration of this time delay at the terminal whose circuit interrupter is first closed, I arrange the time delay means to be responsive to zero-phase-sequence line current of power frequency and unresponsive to the higher frequency transient line-energizing current. Thus the aforesaid minimum time interval will not commence under line energizing conditions, and the prevention of false operation during sequential pole closure by the last-closed circuit interrupter is assured.

In yet another aspect of my invention, false response during the clearing of an external fault is avoided by providing, in conjunction with the first fault detector and the second control means at each terminal of the protected line, transient blocking means to disable the second control means for at least a predetermined short time interval if an external fault persists for longer than a predetermined length of time (which is sufficient to assure proper operation of the second control means during the normal clearing time of any internal fault). In order to ensure the initiation of this transient blocking function at each line terminal when an external fault occurs, regardless of whether the fault current which flows through the protected line to the external fault is seen as in-flowing or out-flowing, I arrange the transient blocking means to be responsive to the concurrence of a starting signal supplied by the first fault detector and either the activation of the local receiver (throughout an interval of said predetermined length) by a communicative signal received from a remote transmitter, or the absence (throughout the same interval) of operation of the local directional sensing means. The same transient blocking arrangement is also useful in a phase fault directional-comparison protective relaying system.

My invention will be better understood and its various objects and advantages will be more fully appreciated from the following description taken in conjunction with the accompanying drawings in which:

FIG. 1 is a schematic circuit diagram, partly in block form, of a ground fault directional-comparison protective relaying system embodying my invention, this diagram showing system components at only one of at least two substantially identical, distantly spaced terminals of an electric power transmission line being protected by my relaying system;

FIG. 2 is a more detailed block diagram of the ground current directional sensing means (GD) and related components and circuitry shown schematically in FIG. 1;

FIG. 3 is a circuit diagram of the logic units of FIG. 2 which are encompassed by dash-line 3;

FIGS. 4 and 5 are circuit diagrams of the measuring and timing component blocks T4 and T5, respectively, shown in FIG. 3;

FIGS. 6a and 6b are block diagrams, each corresponding to the logic portion of FIG. 2 encompassed by the dash-line 3, illustrated alternative embodiments of my invention; and FIG. 7 is a detailed circuit diagram of the portion of FIG. 1 which is encompassed by dash-line 7.

FIGURE 1

Referring now to FIG. 1, I have shown schematically and in block form, for the purpose of illustrating a preferred embodiment of my invention, one terminal of a ground fault directional-comparison protective relaying system for a 3-phase alternating-current electric power transmission line 11 comprising conductors 11A, 11B, and 11C. These conductors represent the means used in a high-voltage electric power system for conducting alternating current of power frequency, such as 60 cycles per second between distantly spaced terminals of the protected line 11. In order to avoid compounded drawing details that are unnecessary for a full and clear understanding of my invention, there has been set forth in FIG. 1 the equipment and relaying components at only one line terminal, identified generally by the reference letter A, and it should be understood that everything therein associated with this particular terminal is duplicated at each line terminal remote therefrom (except only for the relative polarities of the coupling between the relaying system and the electric power line which, at any remote terminal, will be the mirror image of the polarities shown at terminal A).

As is indicated in FIG. 1, the transmission line 11 is connected at its terminal A to a power source (or load) bus 12 by way of a 3-pole circuit interrupter 13, and three conductors 14A, 14B and 14C of relatively short lengths. The local components of the protective relaying system are appropriately coupled to these short conductors. It is the function of the relaying system to initiate opening of the circuit interrupter 13 in high-speed response, and substantially simultaneously with like action at each remote terminal of the protected line, to the occurrence of an internal ground fault, i.e., upon the occurrence of a short circuit between one or more of the phase conductors and ground at any point along the protected line 11. Under such conditions the relaying system is so arranged as to connect a trip coil 15 of the circuit interrupter 13 to a dependable source of electric energy, such as a station battery which is represented in FIG. 1 by the encircled plus and minus symbols, and when thus energized the trip coil 15 actuates a latch 16 thereby releasing switch member 17 of the circuit interrupter for rapid circuit opening movement. A "normally open" auxiliary contact 18 of the circuit interrupter is connected in series with the trip coil 15 to de-energize the same during the circuit opening operation.

The necessary intercommunication between duplicate relaying equipments at the respective line terminals is accomplished in the illustrated embodiment of the invention by utilizing conductor 11C as a pilot channel for the transmission of high-frequency carrier current. Each terminal is equipped with transmitting means TM for generating, upon activation of the transmitter in response to a suitable control signal, a continuous carrier-current communicative signal of high frequency (such as 100,000 cycles per second). An inductance element 19, as can be seen in FIG. 1, is connected between ground and a coupling capacitor 20 which in turn is connected to the phase conductor 11C, and a connection is made from the output of transmitter TM to the junction of elements 19 and 20. The capacitor 20 is designed with sufficient insulation to withstand line voltage, and it easily passes high-frequency carrier current while presenting a high impedance to the transmission line current of power frequency. At each end of the transmission line 11 a parallel resonant circuit comprising an inductance 21 and a capacitor 22 tuned to the carrier-current frequency is connected in series circuit relationship with conductor 11C to provide a wave trap which confines the carrier current to the protected line without introducing any appreciable impedance to current of power frequency flowing through this conductor.

The high-frequency communicative signal generated in the inductance element 19 upon activation of the transmitter TM will cause carrier current to flow in a loop comprising transmitter TM, coupling capacitor 20, conductor 11C, the corresponding coupling capacitor and a receiver at a remote terminal, and a ground return path. As is indicated in FIG. 1, each line terminal is equipped with receiving means RM which is similarly connected to the junction of coupling capacitor 20 and inductance element 19. The receiver RM is tuned to the frequency of the carrier current transmitted by transmitting means at a remote terminal, and hence it is operably energized by the communicative signal received from the remote terminal. In practice, the carrier-current transmitters TM located at the respective line terminals are usually arranged to oscillate at a common frequency, whereby the local receiver RM actively responds to the communicative signal originating from the companion transmitter as well as that received from the distant or remote transmitter. Since the relaying system utilizes carrier current for blocking purposes only (to prevent relay operation in the event of an external fault), proper operation of the system will be obtained even if carrier current were discontinued due to a failure of the pilot channel 11C itself (indicating an internal fault).

Although a carrier-current form of communicative signal has been shown and described in the preferred embodiment of my invention, those skilled in the art will recognize that other known methods of intercommunication could alternatively be employed. For example, a microwave pilot channel is appropriate for this purpose, in which case it is common practice to arrange the signal transmitters TM at the respective line terminals to operate at different frequencies. The relaying system of my invention is adapted to function successfully in such a setting. The system is also well suited for protecting transmission lines having either two or three terminals, and wherever for convenience I herein refer in the singular to a line terminal remote from the local terminal A, it is not my intention to limit the system's application to only a 2-terminal line.

In order to detect the occurrence of a ground fault in the electric power system and to sense its direction, the components of the protective relaying system at the local terminal A are coupled to the transmission line by means comprising three instrument current transformers 23, 24 and 25 associated, respectively, with conductors 14A, 14B and 14C. As is shown in FIG. 1, the common terminals of the star-connected secondaries of these current transformers are connected to a neutral or residual circuit 26 which includes input terminals 26a and 26b of the relaying system. Current will flow in the residual circuit 26 only when phase currents in the transmission line conductors 11A, 11B and 11C are unbalanced, as during a ground fault condition. The residual current is representative of the zero-phase-sequence component of line current, and its magnitude reflects the severity of the power system imbalance.

The relaying components supplied by residual current in the circuit 26 include two fault detecting means G1 and G2, and the first is arranged to operate in response to the magnitude of zero-phase-sequence line current exceeding a predetermined first amount. It is a function of G1 to activate the signal transmitter TM, thereby starting the transmission of carrier current from the local terminal A. The second fault detector G2 is arranged to operate when the magnitude of zero-phase-sequence line current exceeds a predetermined second amount which is greater than the aforesaid first amount but less than the minimum magnitude of ground fault current expected in the transmission line 11 being protected. G2 must be operating in order for the relaying system to initiate tripping of the circuit interrupter 13.

The residual circuit 26 also feeds a ground current directional sensing or discriminating means GD, to be disclosed in detail hereinafter. In order to sense whether or not zero-phase-sequence line current is flowing as though to a ground fault on the protected-line side of the local terminal, GD is additionally supplied with a reference or polarizing quantity against which the residual current can be checked or compared. The polarizing quantity can comprise the zero-phase-sequence component of line voltage, taken from broken-delta connected secondary windings of three instrument potential transformers 27, 28 and 29 which are coupled respectively to the conductors 14A, 14B and 14C, as is shown in FIG. 1. The secondary voltage thus derived, which is representative of zero-phase-sequence line voltage, is supplied to input terminals 30a and 30b of the relaying system by way of the transformer secondary circuit 30.

Alternatively, if a grounding transformer bank 31 is available at the local power system bus (12a), the polarizing quantity can comprise ground current flowing in the power transformer neutral connection 32, taken from an instrument current transformer 33 coupled thereto. The secondary circuit 34 of the current transformer 33 includes input terminals 34a and 34b of the relaying system. If desired, both the voltage and the current sources of polarization for the ground directional discriminating means GD can be concurrently used.

The directional sensing or discriminating means, GD is arranged to operate in response to "in-flowing" zerophase-sequence line current of a magnitude exceeding the aforesaid first amount. Hence a ground fault on the protected line 11 (or on the power system beyond the remote terminal of the line) will cause GD to operate, while a ground fault on the adjoining bus 12 (or nearby on other transmission lines connected to this bus) will not. GD when operated performs two functions: it immediately deactivates the associated transmitting means TM, thereby stopping the transmission of carrier current from the local terminal; and with a coordinated delay introduced by time delay means T.D. (whose purpose and preferred construction are fully explained hereinafter), it attempts to open or trip the circuit interrupter 13. This attempt to trip is blocked so long as the local receiving means RM is receiving carrier current from an active transmitter located at any other terminal of the line. Thus the relaying system will initiate tripping of the circuit interrupters at the respective terminals of the protected line only if the GD component at every terminal is operating, which state indicates that a ground fault has occurred in fact on the protected line.

In FIG. 1 I show schematically the control means and circuitry by which the relaying components GD, G1 and G2 and the receiving means RM are able to carry out the various functions that have been assigned to them. The diagram includes a number of symbolically illustrated "logic units", and an explanation of the symbols employed will now be offered. Each block labeled "OR" represents a circuit or unit which is in an operative state (its output is "on") whenever either (or both) of two alternative inputs is "on". Each "AND" block represents a circuit or unit whose output signal is "on" only when all of the identified inputs are concurrently on. The output of a "NOT" block is "on" only when its input signal is "off", and therefore, when used in conjunction with either the OR or the AND unit, it enables the operation of that unit to be controlled in accordance with the absence rather than the presence of its input.

The basic operation of the protective relaying system shown at the transmission line terminal A in FIG. 1 can now be readily followed. As previously stated, it is desired to open the circuit interrupter 13 in high-speed response to the occurrence of an internal ground fault, which condition is indicated by the operation of the ground current directional discriminating means GD *and* the inoperation of the carrier-current receiving means RM (because no carrier current is being transmitted from any remote terminal of the protected line). As a corollary, it is desired to prevent tripping under all external ground fault conditions, as indicated either by the absence of GD operation *or* the presence of received carrier current at RM.

In order to accomplish both of these objectives faithfully and reliably, the relaying system is so arranged that upon the occurrence of any ground fault detected by the fault responsive means G1, regardless of the location of the fault, a "starting" signal is substantially instantaneously developed at a terminal 38a of the section of relaying components embraced by the dash-line 2. This starting signal is supplied to an AND logic unit 39 which is connected to the local carrier-current transmitter TM to control its activation. The AND unit 39, as can be seen in FIG. 1, is additionally provided with a NOT input 40 which is responsive to a "stopping" signal developed at a terminal 38b of the component section 2 upon subsequent operation of the directional discriminating means GD. The stopping signal is initially absent, and consequently the NOT input to the AND unit 39 is initially on. Unit 39 comprises suitable control means for producing, in instantaneous response to energization by the starting signal, a dependent output control signal which causes activation of TM and hence starts continuous carrier-current transmission from the line terminal A. Later, if and when a stopping signal is developed at 38b, the control means of unit 39 will be rendered ineffective to produce its output control signal which is then cut off or discontinued, thereby deactivating TM and stopping carrier-current transmission from the local terminal. With this arrangement, carrier-current is always started upon the occurrence of a ground fault and is subsequently stopped upon operation of GD.

GD is designed to operate, after a brief delay of approximately 4 milliseconds, if a ground fault condition has occurred on the protected-line side of the local terminal A. In addition to developing the above-mentioned stopping signal at 38b, GD when in operation provides an input for an AND logic unit 42. The unit 42 derives additional input from the time delay means T.D., and its output comprises a first "operating" signal which is conveyed from terminal 38c of the component section 2 to an input terminal 44a of a control circuit 7. The T.D. input to the AND unit 42 in section 2 is turned on not sooner than 6 milliseconds after ground fault inception, and prior to the elapse of this minimum time delay it prevents production of the first operating signal for the control circuit 7.

Within the control circuit 7, the first operating signal when energizing the input terminal 44a is supplied to an AND logic unit 45. As is shown in FIG. 1, a second input for this AND unit 45 is derived from the local carrier-current receiving means RM. The receiving means, when it is activated by carrier-current transmitted from a remote terminal of the protected line, produces a continuous "blocking" signal which is channeled via an OR logic unit 46, an input terminal 44b and a NOT logic unit 47 to the AND unit 45 of circuit 7. The presence of a blocking signal activates the NOT unit 47 which maintains the AND unit 45 in an "off" state. The combination of units 45 and 47 therefore comprises means for comparing the first operating signal to the blocking signal and for keying the succeeding portion of the control circuit only when the former signal is present in the absence of the latter.

The AND unit 45, when on, energizes a timing component T5 of the control circuit 7, and upon the expiration of a predetermined short time delay the timing component thereafter will supply an input signal to another AND logic unit 48. The latter unit additionally receives, as its second input, a second "operating" signal which is developed at terminal 38d of the component section 2 and applied to terminal 44c of the circuit 7 while the second ground fault responsive means G2 is in operation. Whenever both of its inputs are on, the AND unit 48 produces an output. This output comprises a "tripping" signal which is utilized to initiate operation of a static switch represented by the block labeled "CR," whereupon the static switch quickly "closes" to cause energization of the trip coil 15 of the local circuit interrupter 13. A dual purpose is served by the relatively short time delay (e.g., 3 milliseconds) which the timing component T5 introduces in the control circuit 7 when system conditions seem otherwise right for operation. It prevents false response to any momentary lapse in carrier current during external faults, and it serves as part of the overall coordinated delay which has been deliberately provided in the operating sequence of the relaying system to prevent false operation during unequal pole closing conditions.

From the foregoing description of the control circuit 7 (which is shown in greater detail in FIG. 7 to be described hereinafter), it is clear that this portion of my system essentially comprises means to initiate tripping of the local circuit interrupter 13 in response to contemporaneous operations of both GD and G2, which means is disabled or rendered ineffective to accomplish this end by the associated receiver RM so long as an active remote carrier-current transmitter is in communication therewith. Tripping can therefore take place only when such blocking communication ceases, as when the directional discriminating means GD at every terminal of the protected line has developed a stopping signal in response to a true internal ground fault.

Because of a possibility that the above-described directional-comparison protective relaying system may operate incorrectly if an external fault on a parallel electric power transmission line is clearer sequentially, transient blocking means 51 has been provided. The function of this transient blocking means is to temporarily disable the control circuit 7, and thereby prevent tripping of circuit interrupter 13, whenever an external fault in the power system persists for a predetermined length of time, said length being sufficiently long to ensure proper operation of the relaying system in response to true internal ground faults. Any external power system disturbance occurring while the control circuit is so disabled cannot then cause false operation of the relaying system.

As can be seen in FIG. 1, the transient blocking means 51 includes a timing component T4 connected to the OR logic unit 46 for energizing the terminal 44b of control circuit 7 whenever T4 is turned on. The timing component (which may comprise, by way of example, a time delay pickup and dropout circuit like that shown in FIG. 4 and described hereinafter) is arranged to turn on in response to continuous energization by an input signal for an initial interval of said predetermined length (such as 20 milliseconds), and subsequently to turn off upon the expiration of a predetermined interval of time (such as 25 milliseconds) after its input signal is suspended. Accordingly, commencing as soon as the time interval of said predetermined length has elapsed following the application of an input signal to T4, and continuing for at least the duration of said turn-off interval of time, the timing component T4 is effective to activate the NOT unit 47 of the control circuit 7. While thus activated, the NOT unit 47 renders the AND unit 45 inoperative, thereby blocking the tripping signal at the local terminal A of the protected line even should operating signals momentarily be produced concurrently at all of the line terminals.

In accordance with one aspect of my invention, the input signal to the timing component T4 of the transient blocking means 51 is supplied by an AND logic unit 52 which is energized by the starting signal which the first fault responsive means G1 produces when operating. As is indicated in FIG. 1, the AND unit 52 derives its second energizing input from an OR logic unit 53 which has two parallel inputs: one comprising the blocking signal produced by the local receiver RM; and the other comprising a control signal provided by a NOT logic unit 54 the input of which is taken from terminal 38c. The second-mentioned input to the OR unit 53 therefore reflects the absence of the first operating signal which develops at terminal 38c of the component section 2 in response to the operation of the local directional discriminating means GD. The NOT unit 54 is normally effective to enable the AND unit 52 to be turned on in response to a starting signal being applied thereto. But whenever unit 54 is energized as a result of GD operation, its control signal is then suspended and the AND unit 52 is consequently disabled unless concurrently energized by a blocking signal supplied by RM.

With this arrangement an input signal is supplied to the timing component T4 of the transient blocking means 51 only on the inception of a power system fault (as indicated by operation of the fault detector G1) located externally to the protected line (as indicated, if the fault is "behind" the local terminal A, by the resulting inoperation of GD, or, if the fault is on the far side of a remote terminal of the line, by the presence of a blocking signal due to carrier current being received from an active transmitter at the remote terminal). The timing component then responds as described above to carry out the intended function of the transient blocking means 51. It will be apparent that there is no need to utilize a common frequency for the carrier current communication system between terminals in order to properly initiate this transient blocking function.

FIGURE 2

Having explained the overall operation of the relaying system with reference to FIG. 1, I will now describe in greater detail the preferred circuitry and operation of certain components of the system. FIG. 2 shows in more detail the component section 2 of FIG. 1. This section includes the two ground fault responsive means G1 and G2, the ground directional discriminating means GD, and the coordinating time delay means T.D. While the respective functions which these related components perform in the overall system have been considered hereinbefore, they will be recapitulated or amplified where necessary below. It will be observed in FIG. 2 that I have additionally provided a third ground fault responsive means G3, the purpose of which will soon be explained.

The components shown in FIG. 2 are adapted to be coupled to the electric power transmission line by way of the input terminals 26a and 26b which are included in the current transformer residual circuit 26. Interconnected in series between these input terminals are the primary windings of three different "transactors" 61, 62 and 63. A transactor is a known device having electrical characteristics similar in some respects to a conventional transformer and similar in other respects to a reactor. In effect it is an air-gap reactor having associated therewith primary and secondary windings, with a load circuit being connected to the secondary winding. The voltage derived across the secondary winding of a transactor is accurately representative, both in magnitude and phase, of the net primary current energizing it, and the absolute magnitude of the secondary voltage and the specific angle by which this voltage leads the net primary current are controlled by the amount of load in the secondary circuit.

The secondary winding of each of the transactors 61, 62 and 63 is tapped midway between its opposite ends, and each midtap is connected to a common reference bus (identified in FIG. 2 by the encircled letter R) of a suitable source of D.-C. supply voltage. Although not shown in FIG. 2, suitable surge suppressing means can be provided in the secondary circuits of each of the transactors. The secondary circuit for the transactor 61 includes a pair of resistors 64a and 64b, connected respectively to opposite ends of the secondary winding, and a voltage limiter 65 (comprising a pair of back-to-back connected Zener diodes) connected in shunt therewith. This circuit also includes a phase splitting and rectifying device 66 which is supplied by the A.-C. voltage appearing across the limiter 65. I select a limiter 65 that will remain in its high-impedance state at the relatively low levels of voltage to which the succeeding circuits critically respond.

In FIG. 2 the phase splitting and rectifying device 66 is shown as a block labeled "φS." This block represents any suitable means for producing a D.-C. output dependent upon the amplitude of the A.-C. voltage which is supplied thereto, the output quantity having significantly reduced ripple and yet being substantially instantaneously responsive to any amplitude variations in the A.-C. input. Preferably φS comprises the improved system which is the claimed subject matter of Patent No. 3,088,066 granted on April 30, 1963, to Harold T. Seeley and assigned to the assignee of the present application.

The output quantity of φS provides an input for a level-sensitive switching device 67 which will "pick up" (that is, become operative to produce an output signal of constant magnitude) in instantaneous response to its input magnitude attaining a predetermined critical level. This device may comprise, for example, a snap-action transistorized circuit like that disclosed and claimed in Patent No. 3,067,340 granted to Merwyn E. Hodges on December 4, 1962. I arrange this level detecting means to operate at a critical input level which corresponds to the aforesaid predetermined first amount of zero-phase-sequence line current. In other words, the system is so arranged that when the magnitude of the zero-phase-sequence component of transmission line current has increased to its predetermined first amount, the representative output quantity of ϕS will have just attained the critical level to which 67 operatively responds. It is therefore apparent that the device 67 is the first ground fault responsive means G1 of the relaying system, and when in operation it develops the above-mentioned starting signal at terminal 38a. It also supervises the operation of the ground directional means GD in a manner and for a reason soon to be explained.

As can be seen in FIG. 2, the secondary circuit of the second transactor 62 includes a full-wave rectifier arrangmement comprising a pair of diodes 68a and 68b connected to opposite ends of the transactor secondary winding. The D.-C. quantity thus derived is supplied directly, without filtering, to another level-sensitive switching device 69 which will "pick up" (that is, become operative to produce an output signal of constant magnitude) in instantaneous response to the magnitude of the D.-C. quantity attaining a predetermined critical level. I arranged this device and its input circuitry so that it operates at a critical level coresponding to the aforesaid predetermined second amount of zero-phase-sequence line current, and it is apparent therefore that device 69 is the second ground fault responsive means G2 referred to above. The output signal produced when G2 is operating is conveyed by way of an OR logic unit 70 to terminal 38d where it causes the above-mentioned second operating signal to be developed.

While the details of the switching device 69 may be similar to those of the companion device 67, I prefer to omit the transient negative feedback feature and to arrange 69 for producing an intermittent or pulsing output signal rather than a continuous one. The reason for this will be made apparent hereinafter, and for now it is sufficient to understand that the device 69 is not maintained in operation when its unfiltered D.-C. input quantity, between successive peaks thereof, falls below the aforesaid critical level to which this device operatively responds. Consequently, the signal which G2 produces when the instantaneous magnitude of the zero-phase-sequence component of line current exceeds the predetermined second amount, is suspended in substantially instantaneous response to zero-phase-sequence line current subsequently decreasing below this amount.

The secondary circuit of the third transactor 63, as can be seen in FIG. 2, comprises a parallel resistor-capacitor frequency compensating circuit 71 and a pair of diodes 72a and 72b for full-wave rectification. The D.-C. quantity thus derived provides an input for yet another level-sensitive switching device 73 which will "pick up" in instantaneous response to its input magnitude attaining a predetermined critical level. This device is shown as a block labeled G3, and it comprises the third ground fault responsive means of my relaying system. The details of the device 73 may be the same as those of the companion device 67, except that it is arranged to operate at a critical input level which corresponds to zero-phase-sequence line current attaining a predetermined third amount which is even greater than the aforesaid second amount. The basis for selecting this predetermined third amount will be fully explained hereinafter. When in operation the third ground fault responsive means G3 energizes a terminal 74a and also provides an alternative input for the OR unit 70.

Next consider the ground current directional discriminating means, which is shown in FIG. 2 within the broken-line enclosure identified by the reference character "GD." This component of my relaying system is energized by the A.-C. secondary voltage of transactor 61, which voltage has a fixed phase relationship to the residual current flowing between the input terminals 26a and 26b. The transactor 61 hence supplies GD with a succession of operating voltage impulses of duration and polarity representative of succeeding half cycles of the zero-phase-sequence component of line current.

The ground directional means GD is also energized from the voltage and current sources of polarization referred to hereinbefore. A tapped autotransformer 75 is connected across input terminals 30a and 30b and provides A.-C. voltage proportional to zero-phase-sequence line voltage. A transactor 76 connected to the input terminals 34a and 34b derives an A.-C. secondary voltage having a fixed phase relationship to ground current flowing in the local grounding transformer bank of the electric power system. The autotransformer 75 and the secondary winding of transactor 76 are serially interconnected as shown in FIG. 2, and transforming means 77 is provided to transform the resulting combination of their respective voltages. The secondary winding of the transforming means 77, which is connected to the reference bus R midway between its opposite ends, supplies GD with a succession of reference voltage impulses of duration and polarity representative of succeeding half cycles of the combined polarizing quantity. Since the polarity of zero-phase-sequence line current relative to the polarizing quantity will vary according to the direction of unbalanced power flow at the local terminal of the protected line, the operating voltage impulses which are supplied by transactor 61 have a variable overlapping phase relation with respect to the reference voltage supplied by transforming means 77.

In order to sense the direction of a ground fault in the power system, the ground directional means GD includes (1) discriminating means 78, 79, 80 for providing a measure of the phase relationship between the operating and reference quantities which are supplied to it, and (2) measuring means 81 for effecting operation of GD whenever this measure indicates "in-flowing" current. More specifically, the discriminating means which is supplied by the aforesaid operating and reference voltage impulses, is arranged when operative to develop a train of substantially constant magnitude unipolarity resultant voltage impulses having periods of duration coinciding to the periods during which operating impulses overlap reference impulses of like polarity, and the measuring means 81 operatively responds to the persistence of any resultant impulse longer than the duration of approximately a quarter of a power frequency cycle (e.g. 4 milliseconds in a 60 c.p.s. system). Since zero-phase-sequence line current (from which the operating impulses are derived) is substantially in phase with a polarizing quantity (from which the reference impulses are derived) when ground current is flowing toward a fault on the protected-line side of the local terminal, and these quantities are essentially 180° out of phase if ground current is flowing in the opposite direction, the measuring means 81 is caused to operate only by in-flowing zero-phase-sequence current.

In the illustrated embodiment of the ground directional means GD, the discriminating means comprises identical coincidence circuits 78 and 79, but these circuits are arranged for alternate response during the "positive" and "negative" half cycles, respectively, of the quantities supplied thereto. This result obtains because, as can be seen in FIG. 2, the lower end of the secondary winding of transactor 61 is connected to the coincidence circuit 78 while the upper end of this winding is connected via terminal 74b to the companion circuit 79, and the lower end of the secondary winding of transforming means 77 is connected to the coincidence circuit 78 while the upper end of this winding is connected via terminal 74c to the circuit 79. Coincidence circuit 78 then serves to produce a resultant voltage impulse during that portion of every power-frequency cycle when the lower ends of the two windings, relative to their upper ends, respectively, are simultaneously positive, while the coincidence circuit 79 serves to produce a resultant voltage impulse during a different portion of the same cycle when the lower ends are simultaneously negative.

As is shown in FIG. 2, GD is also connected to the first ground fault responsive means G1. In accordance with one aspect of my invention, G1 must be in operation (picked up) in order for GD to operate. This is accomplished in the preferred embodiment of the invention by supplying a continuous supervising signal, taken from the output of G1, to each of the coincidence circuits 78 and 79 in GD where its presence is required to render these circuits operative. The advantage of this supervision can now be appreciated. The ground current directional discriminating means GD is designed to be very sensitive— that is, the instantaneous magnitudes of the operating and reference quantities need only exceed a very low threshold level in order for the coincidence circuits 78 and 79 of GD to detect their polarity coincidence. While this sensitivity is desirable from a point of view of improving the speed and accuracy with which GD responds to relatively low-grade ground faults, it also tends to increase the risk of improper operation, due to past current unbalance or stray signals below the level of G1 pickup, when an external ground fault first occurs. Such past conditions could result in a false operation by the measuring means 81 of GD at the line terminal where ground current reverses direction from internal to external. The supervision of GD by G1, according to my invention, avoids this problem since it prevents initial energization of the measuring means 81 in GD by a coincidence circuit (78 or 79) until the magnitude of zero-phase-sequence line current has actually attained the predetermined first amount to which G1 operatively responds, whereby a subsequent interval longer than approximately 4 milliseconds of continuous polarity coincidence between operating and reference quantities is required for GD operation.

The coincidence circuit 79 in its preferred form is illustrated by logic symbols in FIG. 2. (This circuit, together with the succeeding components which have been encompasesd in FIG. 2 by dash-line 3, is shown in still greater detail in FIG. 3, soon to be described.) The operating voltage impulses applied to the terminal 74b and the G1 supervising signal which is supplied via a terminal 74d provide, respectively, two different inputs for an AND logic unit 82. This unit is turned on while the supervising signal is present and the input from terminal 74b is concurrently positive (relative to the reference bus R). As is shown in FIG. 2, the output of unit 82 supplies an input signal for another AND logic unit 83 of the coincidence circuit 79, and it also feeds a measuring component 84 of the time delay means T.D. (the purpose of which is explained below).

The AND unit 83 is provided with a second input by the reference voltage impulses which are applied to terminal 74c, and this unit produces a succession of resultant output signals each having a duration corresponding to that portion of a power-frequency cycle during which the AND unit 82 is "on" and the input from terminal 74c is concurrently positive (relative to the reference bus R). The output of the AND unit 83 serves as an input for an OR logic unit 80. An alternative input for the latter unit is taken from terminal 74e which is energized by a similar succession of resultant output signals produced by the coincidence circuit 78. Thus it is apparent that the output of unit 80 comprises a train of resultant signals or impulses having periods of duration dependent upon the periods of polarity coincidence between the operating and reference A.-C. quantities during successive half cycles thereof. This output is used to energize the measuring means 81, shown in FIG. 2 as a block labeled "T4."

The measuring means or component 81 comprises a time delay pick-up and drop-out circuit such as that which is shown in FIG. 4 and described hereinafter. It is arranged to turn on whenever any one of the resultant impulses developed by the OR unit 80 persists for approximately 4 milliseconds and to remain on, following every turn-on incident, for approximately 9 milliseconds (slightly longer than the duration of one-half a power frequency cycle, on a 60 c.p.s. basis). Accordingly, the measuring component 81 operates about 4 milliseconds after the inception of an internal ground fault to produce a continuous output indicating a fault in that direction. Actually component 81 develops a pair of integral output signals: one labeled "stopping signal" is applied to terminal 38b, and the other labeled "control signal" provides an input for the AND unit 42.

Consideration will now be given to the associated time delay means T.D., the preferred embodiment of which in FIG. 2 is shown within the broken-line enclosure identified by the reference character "T.D." The time delay means includes the measuring component 84 which is energized by the output of the AND unit 82 of the coincidence circuit 79. This output commences when G1 picks up and comprises a succession of substantially constant magnitude voltage blocks coinciding in duration to the above-defined "negative" half cycles of the A.-C. operating quantity derived from zero-phase-sequence line current. As is indicated in FIG. 2, another measuring component 85 in T.D. is fed from a terminal 74f energized by a similar output of the companion coincidence circuit 78, which output commences when G1 picks up and comprises a succession of substantially constant magnitude voltage blocks corresponding to the opposite-polarity or "positive" half cycles of zero-phase-sequence current. The measuring components 84 and 85 in turn are disposed to provide alternative input signals for an OR logic unit 86.

The two measuring components 84 and 85, which are identical in construction, are each shown in FIG. 2 as a block labeled "T4." A preferred circuit diagram of this time delay pick-up and drop-out device is illustrated in FIG. 4 and will soon be described. Each component 84, 85 is arranged to operate (turn on) in response to a block of its input voltage persisting for a predetermined first interval of time (such as 4 milliseconds) and to remain in operation for at least 9 milliseconds thereafter. Each measuring component while operating energizes, by way of the OR unit 86, a common timing component 87 which is shown in FIG. 2 as a block labeled "T5." A preferred circuit diagram of this time delay pick-up and instantaneous drop-out device 87 is illustrated in FIG. 5 and will soon be described.

Timing component 87 is arranged to turn on when continuously energized by either 84 or 85 for a second interval of time (such as 2 milliseconds), and subsequently to turn off in substantially instantaneous response to said energization being suspended. When "on," the output of this component (comprising, as is noted in FIG. 2, the "first coordinating" signal produced by T.D.) supplies input to a succeeding OR logic unit 88. An alternative input to unit 88 is furnished by a "second coordinating" signal which is developed at terminal 74a upon operation of the third ground fault responsive means G3.

The OR unit 88 in turn provides a second input for the AND unit 42 whose first input, as previously described, comprises the control signal produced upon operation of GD. The AND unit 42 is rendered effective by the coordinating signal received by way of 88 to produce the aforesaid first operating signal at terminal 38c when GD is operating. It is therefore apparent that on the inception of a ground fault (assuming the fault is not so severe as to cause G3 operation), the time delay means T.D. will prevent any attempt-to-trip operation by the local relaying system until after the expiration of a minimum time delay the length of which is equal to the sum of the first and second time intervals referred to above.

The purpose of the time delay means T.D. which delays operation of the relaying system in the manner just described, and the particular advantages of the preferred embodiment of T.D. as it is revealed in FIG. 2, can now be readily understood. The minimum delay introduced by T.D. serves first of all as an integral part of an overall coordinated time delay which is provided in order to ride out the worst unequal pole closing interval expected.

The possibility of a ground current directional-comparison protective relaying system operating falsely in response to unbalanced line currents caused by uneven or sequential pole closure of the circuit interrupter at the last-closed terminal of the protected line has been discussed in the introductory portion of the present specification. Because of this possibility, I do not permit the relaying system to initiate the opening of a circuit interrupter until after a predetermined time delay of 9 milliseconds has elapsed following operation of the ground fault responsive means G1. It can be assumed that each line terminal is equipped with a circuit interrupter capable of closing with no more than a half cycle difference (on a 60 c.p.s. power frequency basis) in the closing times of its respective poles; hence the coordinated time delay of 9 milliseconds which I have selected, being slightly longer than the duration of a half cycle of 60 c.p.s. alternating current, clearly avoids the above-mentioned possibility of erroneous operation during an unequal pole closing interval.

The 9-millisecond coordinated time delay is achieved in part by the time delay means T.D. and in part by the timing component T5 in the control circuit 7 (FIGS. 1 and 7). The former contributes initially a minimum of 6 milliseconds to the cumulative total, while the latter contributes an additional delay of 3 milliseconds. With this arrangement the overall operating delay under true internal ground fault conditions is kept as short as possible, being just long enough to prevent false response in the event of unequal pole closure.

Because the coordinated delay has been minimized in furtherence of the goal of high-speed response, a possibility exists that upon the expiration of this 9-millisecond delay, if the last pole in fact did not close until the end of the allocated interval, both the ground directional means GD and the time delay means T.D. may still be in operative states even though no ground fault has occurred. In other words, the small margin (less than one millisecond) between the latest possible subsidence of the zero-phase-sequence current caused by unequal pole closure and the expiration of the minimum coordinated time delay may not allow sufficient time for the measuring component 81 in GD, or for both of the components 84 and 85 in T.D., to turn off or reset. Under such conditions I rely on the second ground fault responsive means G2 to block relay operation.

As has been explained hereinbefore, G2 is arranged to drop out, thereby suspending the second operating signal, in substantially instantaneous response to the magnitude of the zero-phase-sequence component of line current decreasing below the aforesaid predetermined second amount. While this feature causes G2, under operating conditions, to produce a pulsing or intermittent operating signal (the periodic gaps in which become appreciably shorter as the zero-phase-sequence line current rises above said second amount), it also results in G2 resetting very quickly when unequal-pole-closing current subsides, whereby the second operating signal is no longer supplied to the control circuit 7 (FIGS. 1 and 7) and this circuit is immediately rendered ineffective to initiate tripping of the local circuit interrupter.

Another potential obstacle to the proper performance of the scheme illustrated in FIG. 2 is presented by the phenomenon of line charging current, and the time delay means T.D. is utilized in the illustrated embodiment of my invention to overcome this obstacle. Reference was made in the introductory portion of the present specification to the fact that when electric power is first applied to a de-energized transmission line, transient line-energizing current having a zero-phase-sequence component will flow therein. This inrushing current superifically appears as ground fault current to the relaying system at the line terminal whose circuit interrupter is first closed. If the coordinated time delay which is supposed to prevent false operation at this terminal during an unequal pole closing interval were then to commence running, and if the circuit interrupter at the remote terminal should begin closing shortly thereafter, the coordinated time delay might prematurely expire before the last pole of the remote circuit interrupter is subsequently closed.

There is, however, a significant difference between zero-phase-sequence line-energizing current and the zero-phase-sequence line current which flows because of unequal pole closure or when a true ground fault occurs in the power system: the frequency of the former, which is a function of the length of the line, ordinarily is at least several times higher than the characterizing power frequency (60 c.p.s.) of the latter. I capitalize on this difference in arranging the time delay means T.D. to ignore line-energizing current, whereby the coordinated time delay cannot be initiated on the advent of zero-phase-sequence transient line energizing current. While this result can be obtained by using a suitable filter in the A.-C. circuits supplying the time delay means, I prefer to use a "frequency checking" technique which is inherent in the T.D. arrangement shown in FIG. 2 and previously described.

Each of the alternative measuring components 84 and 85 in the time delay means T.D. has been designed to operate as soon as an energizing voltage block supplied by the AND unit 82 of the associated coincidence circuit persists for at least the aforesaid first interval of time. Therefore T.D. operation is possible only if zero-phase-sequence line current has a frequency lower than one-half the reciprocal of the same interval. The critical interval is selected to be longer than any half cycle of the relatively high-frequency transient line-energizing current, whereby the measuring components 84 and 85 remain inoperative and the coordinated time delay cannot begin under line energizing conditions.

Each of the components 84 and 85 may be arranged to have a turn-on delay of approximately 4 milliseconds, which means that it responds only to zero-phase-sequence line current of a frequency lower than about 120 c.p.s. This necessarily excludes response to zero-phase-sequence transient line-energizing current which ordinarily oscillates at a higher frequency (not less than 180 c.p.s.), while it will definitely permit the desired response to the inception of any true ground fault (as reflected by zero-phase-sequence line current of power frequency).

The balance of the minimum delay of 6 milliseconds which the time delay means T.D. is required to contribute is introduced by its timing component 87. This component has been designed to turn on as soon as its input persists for at least the aforesaid second interval of time, i.e. 2 milliseconds. When this interval elapses, following operation of either one of the two measuring components 84 and 85, the first coordinating signal is produced thereby enabling the AND unit 42 to operate if GD is then in operation.

Preferably the minimum delay (4 milliseconds) which the measuring components 84, 85 initially introduce is set as short as practicable, consistent with the intended frequency checking function of these components, and the selection of this delay is therefore predetermined by the known frequency of line energizing current for the particular transmission line to be protected. The additional definite delay (2 milliseconds) introduced by the timing component 87 is set so that the total delay equals the requisite 6 milliseconds. Allocating the total in this manner tends to assure that the minimum 6-millisecond delay will be realized under all possible conditions. Furthermore, it will help reduce the *maximum* delay which T.D. may contribute under certain operating conditions, thereby abetting high-speed operation of the relaying system. Such a condition occurs, for example, when the initial voltage block supplied to the first-energized measuring component (84 or 85), as the result of a chance "angle of incidence" of the ground fault, is just slightly shorter than the first interval required for operation. The turn-on delay of the companion measuring component will be tacked onto this initial period of inoperation, and consequently the length of time required for T.D. operation under such a condition is extended to 6 milliseconds plus a large portion (e.g. 3.5 milliseconds) of the first interval.

As is shown in FIG. 2, the time delay means T.D. is completely bypassed by the third ground fault responsive means G3. G3 will produce a continuous second coordinating signal in high-speed response to the magnitude of zero-phase-sequence line current exceeding the aforesaid predetermined third amount, which amount is selected to be above the maximum magnitude of zero-phase-sequence current that can flow as a result of line energization or unequal pole closure. The second coordinating signal is supplied to the AND unit 42 by way of the OR unit 88 as shown, and it therefore enables unit 42 to operate before the above-discussed 6-millisecond time delay has elapsed. This faster operation is appropriate when G3 operates, since there is then no need for the time delay provided by T.D. There is similarly no need then for the fast reset made possible by G2, and therefore G3 is also connected by way of the OR unit 70 to terminal 38d from which the continuous coordinating signal produced by G3 while operating is supplied to terminal 44c of the control circuit 7 (FIGS. 1 and 7).

Having now fully described with reference to FIG. 2 the respective functions of the logic units and related components comprising GD and T.D. in their preferred forms, consideration will next be given to a diagram revealing in greater detail the circuits of those units and components which in FIG. 2 are encompassed by the dash-line 3. The circuit diagram referred to is set forth in FIG. 3, and a description of it is presented below.

FIGURES 3, 4 AND 5

The coincidence circuit 79 utilized in the preferred embodiment of my invention, as it is shown in FIG. 3, is the claimed subject matter of Patent No. 3,196,290 granted on July 20, 1965, to E. J. Hopkins and assigned to the assignee of the present application. This circuit receives a supervising signal from terminal 74d, an operating quantity from terminal 74b and a reference quantity from terminal 74c. It also receives control power from a source of regulated D.-C. supply voltage which comprises, for example, a battery 101 having connected thereto suitable protection and regulating means 102. For the sake of drawing simplicity, I have used throughout the drawings the encircled letters R and S to represent, respectively, the common reference bus (energized from the negative terminal of the battery 101) and a supply voltage bus which is positive with respect to the reference bus. The magnitude of the supply voltage is preferably about 20 volts. For convenience I also derive from this source two other buses which are energized by bias potentials: the negative bias bus, represented by the encircled letter R', has a level of potential slightly more positive than the reference bus R; and the positive bias bus, represented by the encircled S', has a level of potential slightly less positive than the supply voltage bus S.

As can be seen in FIG. 3, the coincidence circuit 79 includes an NPN transistor 103. The base electrode of this transistor is connected by way of a current limiting resistor 104 to the terminal 74d for energization by the supervising signal when G1 is picked up. (The supervising signal when present comprises a continuous D.-C. voltage that is positive with respect to the reference bus and has a magnitude nearly equal to the magnitude of the supply voltage.) The base electrode of another NPN transistor 105, which is disposed in tandem with transistor 103, is connected through a pair of resistors 106 and 107 to the terminal 74b for energization by the operating quantity which is representative of zero-phase-sequence line current. (The operating quantity is an A.-C. voltage comprising a succession of impulses or half cycles which are alternately negative and positive with respect to the reference bus.)

The transistors 103 and 105 comprise the AND logic unit 82 of the coincidence circuit 79. As is shown in FIG. 3, the emitter of transistor 105 is connected directly to the reference bus R. The collector of transistor 105 and the emitter of transistor 103 are inter-connected as shown. The collector of transistor 103 is connected to the supply voltage bus S by way of a load impedance comprising a pair of resistors 108a and 108b in series. A base resistor 109 is connected between the base electrode of transistor 103 and the reference bus, while a pair of oppositely poled voltage limiting diodes 110 are connected in parallel relationship between reference bus and the junction of resistors 106 and 107. Each of the pair of diodes 110 selected has an inherent forward voltage drop greater than the base-to-emitter voltage of transistor 105 when conducting.

The AND unit 82 is turned on only when both of the transistors 103 and 105 are rendered conductive. So long as either one of these transistors is in a non-conductive state (inactive), no current of appreciable magnitude can flow in the load impedance and hence there is negligible voltage drop across resistor 108b. But whenever both transistors are concurrently active, their serially connected emitter-collector circuits readily conduct load current and the junction between resistors 108a and 108b becomes appreciably negative, with respect to the supply voltage bus S. This junction is connected to the base electrode of a normally inactive PNP transistor 111, whose emitter is connected directly to the positive bias bus S' and whose collector is connected through two voltage dividing resistors 112a and 112b to the reference bus R, the latter resistor having a much greater resistance value than the former. A portion of the load current conducted jointly by the transistors 103 and 105 will follow a path through the emitter-base junction of transistor 111, thereby forward biasing the same, and the latter transistor is turned on simultaneously with the AND unit 82. Whenever the transistor 111 is thus turned on, its collector current produces across resistor 112b an output voltage of substantially constant magnitude nearly equal to the magnitude of the supply voltage.

It is apparent in FIG. 3 that in order for both transistors 103 and 105 to be active, their base electrodes must simultaneously be energized by the supervising signal received from terminal 74d and a positive operating voltage impulse at terminal 74b, respectively. Whenever the instantaneous magnitude of an operating voltage impulse of positive polarity (relative to the reference bus R) exceeds the relatively low threshold level required to effect forward current flow in the emitter-base junction of transistor 105, this transistor is active. However, no significant amount of load current can flow unless the emitter-base junction of the companion transistor 103 is also forward biased by the presence of a supervising voltage signal at terminal 74d. It is only during the periods of concurrent activation of both of these transistors that the associated inverting transistor 111 is active, and therefore the output voltage taken from resistor 112b comprises a succession of positive voltage blocks coinciding in duration to the positive half cycles of the A.-C. operating quantity applied to terminal .74b while G1 is picked up.

The coincidence circuit 79 shown in FIG. 3 includes yet another NPN transistor 113. The base electrode of transistor 113 is connected through a pair of resistors 114 and 115 to the terminal 74c for energization by the reference quantity which is representative of the zero-phase-sequence polarizing voltage or current. (This quantity is an A.-C. voltage comprising a succession of impulses or half cycles which are alternately negative and positive with respect to the reference bus R.) The emitter of the transistor 113 is connected directly to the reference bus R, while the collector is connected to the supply voltage bus S through a load impedance comprising a pair of resistors 116a and 116b in series. A pair of oppositely poled voltage limiting diodes 110 are connected in parallel relationship between the reference bus and the junction of resistors 114 and 115.

So long as transistor 113 is in a non-conductive state (inactive), no current of appreciable magnitude can flow in the load impedance and hence there is negligible voltage drop across resistor 116b. But whenever this transistor is active, its emitter-collector circuit readily conducts load current and the junction between resistors 116a and 116b becomes appreciably negative, with respect to the supply voltage bus S. This junction is connected to the base electrode of a normally inactive PNP transistor 117 whose emitter is connected to the collector of the transistor 111 and whose collector is connected through two voltage dividing resistors 118a and 118b to the reference bus R, the latter resistor having a much larger resistance value than the former. The emitter-base junction of transistor 117 is forward biased only when the transistor 113 is active.

The transistors 111 and 117 in tandem comprise the AND logic unit 83 of the coincidence circuit 79 as it is illustrated in FIG. 3. The output signal of this unit comprises the voltage developed across resistor 118b when both transistors are concurrently active. So long as either transistor 111 or transistor 117 is in a non-conductive state (inactive), no current of appreciable magnitude can flow in the resistor 118b and hence the level of potential at the junction between the voltage dividing resistors 118a and 118b is substantially the same as that of the reference bus R. But whenever both of these transistors are on at the same time, their serially connected emitter-collector circuits readily conduct load current which produces across resistor 118b a unipolarity output voltage of substantially constant magnitude nearly equal to the magnitude of the supply voltage.

It is apparent in FIG. 3 that in order for both of the transistors 111 and 117 to be active, the AND unit 82 must be turned on and the transistor 113 must concurrently be conductive. The latter transistor is in a conductive state whenever the instantaneous magnitude of a positive reference voltage impulses at terminal 74c exceeds the relatively low threshold level required to effect forward current flow in its emitter-base junction, and at this time transistor 117 is forward biased. However, no significant amount of collector currents can be conducted by transistor 117 unless at the same time the emitter-base junction of the companion transistor 111 is forward biased as a result of the simultaneous activation of the two transistors 103 and 105 comprising the AND unit 82. This occurs, as explained above, throughout the positive half cycles of the A.-C. operating quantity applied to terminal 74b while G1 is picked up. Consequently, when G1 picks up the coincidence circuit 79 is operative to produce resultant voltage across resistor 118b during that portion of every power-frequency cycle when the operating and reference voltages applied respectively to the terminals 74b and 74c are simultaneously positive (with respect to the supply voltage reference bus R). The duration of this resultant voltage signal during each cycle therefore indicates the phase relationship between the operating and reference voltage inputs, whereby it provides a measure of the phase angle between zero-phase-sequence line current and the zero-phase-sequence polarizing quantity.

The resultant voltage impulses thus produced by the coincidence circuit 79 are used to energize the measuring means or component 81 of the ground directional means GD. Toward this end, as can be seen in FIG. 3, the junction between the voltage dividing resistors 118a and 118b is connected by way of a diode 119 to an input terminal 4a of the component 81. The diode 119 comprises one element of the OR logic unit 80 which includes another identical element or diode 120. The latter diode interconnects the input terminal 4a of component 81 and the terminal 74e which is energized, as indicated in FIG. 2, by the resultant voltage impulses alternatively produced by the opposite-polarity coincidence circuit 78. Consequently, the measuring component 81 is energized by a train of resultant voltage impulses having periods of duration dependent upon the periods of polarity coincidence between the operating and polarizing A.-C. quantities during successive half cycles thereof.

The function of the measuring component 81 is to effect operation of the ground current directional discriminating means GD when energized by any resultant voltage impulse which persists for approximately as long as 4 milliseconds. Resultant impulses of such duration, as has been explained hereinbefore, are produced only if zero-phase-sequence line current is flowing as though to a ground fault on the protected-line side of the local line terminal. The component 81, represented in FIG. 3 by the block labeled T4, is a time delay pick-up and drop-out circuit such as that shown in FIG. 4 which will now be described.

The input terminal 4a of the T4 circuit is connected by means of an isolating diode 125 and a resistor 126 to the reference bus R. An energy storing circuit, comprising a resistor 127 of variable resistance (a rheostat or the like) in series with a capacitor 128, is connected across the resistor 126, with an appropriately poled diode 129 shunting the rheostat 127 in order to provide, in conjunction with resistor 126, a relatively low-impedance path for capacitor discharge current. The voltage developed across capacitor 128 is utilized to control level detecting means comprising a double-base diode 130 which is known in the art as a unijunction transistor. The unijunction transistor 130 has an emitter which is connected through a current limiting resistor 131 to the relatively positive terminal of capacitor 128. Base-one of the unijunction transistor (the lower base electrode as viewed in FIG. 4) is connected through a resistor 132 to the reference bus R, while base-two is connected through a resistor 133 to the supply voltage bus S. Preferably the resistances of the base resistors 132 and 133 are selected to be equal to each other.

While the terminal 4a is being energized by one of the resultant voltage impulses supplied by a preceding coincidence circuit, the capacitor 128 charges until its voltage attains a predetermined critical level. At this level a characteristic peak point emitter voltage is reached and the unijunction transistor 130 fires (that is, it abruptly switches from a high impedance to a low impedance state). The time required to reach the critical firing level, measured from the initial moment of energization, is determined by the time constant of the series RC energy storing circuit 127, 128, and the rheostat 127 preferably is so adjusted that this "pickup" time is equal to approximately 4 milliseconds. Thus the unijunction transistor operates only in response to an energizing voltage impulse of at least 4-millisecond duration. If the energizing impulse should expire at any time before the end of this 4-millisecond delay, the diode 129 enables the capacitor 128 to discharge very quickly, thereby "resetting" the circuit with dispatch.

The parameters of the above-described portion of the T4 circuit are chosen so that the unijunction transistor 130 operates in a relaxation oscillator mode; upon firing, this transistor produces an output pulse at its base-one which is coupled by a capacitor 134 to the remaining part of the circuit. As can be seen in FIG. 4, the capacitor 134 is clamped to the reference bus R by a diode 135 and, with a current limiting resistor 136, is connected between base-one of the unijunction transistor and the base electrode of an NPN transistor 137. The emitter of transistor 137 is connected directly to the negative bias bus R', while its collector is connected to the supply voltage bus S through a load impedance comprising a pair of resistors 138a and 138b in series. A base resistor 139 of variable resistance interconnects the base electrode of transistor 137 and the reference bus, and the emitter-base junction of this transistor is normally reversely biased.

Each output voltage pulse produced by the unijunction transistor 130 upon operation thereof, being applied to the base electrode of transistor 137, will instantaneously initiate forward current conduction in the emitter-base junction of the transistor 137 which is activated in response thereto. The emitter-collector circuit of this transistor then conducts load current in its saturated region, and the potential at the junction of the load resistors 138a and 138b immediately becomes appreciably negative with respect to the supply voltage bus S. This junction is connected to a base electrode of a normally inactive PNP transistor 140 whose emitter is connected directly to the positive bias bus S' and whose collector is connected to the reference bus R through two voltage dividing resistors 141a and 141b, the latter having a much larger resistance value than the former. A portion of the load current conducted by the transistor 137 will follow a path through the emitter-base junction of transistor 140, thereby forward biasing the same, and the latter transistor is thus turned on and off simultaneously with the former. When transistor 140 is turned on, there is derived across resistor 141b and output control signal of substantially constant magnitude nearly equal to the magnitude of supply voltage. This output is taken from terminal 4b of the T4 circuit.

In order to ensure that the transistor 137 (and hence the companion inverting transistor 140) remains activated for a predetermined length of time following receipt of each output pulse from the unijunction transistor 130, a transient negative feedback arrangement is employed. This arrangement, which is constructed and operates in accordance with the teachings of Patent 3,067,340, Hodges; comprises a unilaterally conductive energy storing circuit connected in parallel with the collector-base junction of the transistor 137 to sustain forward bias of this transistor, thereby sustaining load-current conduction, while accumulating energy under conditions of decreasing conduction in transistor 137. Preferably, as it is illustrated in FIG. 4 the circuit comprises a normally charged capacitor 142 in series with a diode 143, and an additional diode 144 is connected between the junction of these elements and the reference bus R to provide a low-impedance path for quickly dissipating the stored energy of capacitor 142 under conditions of increasing conduction in transistor 137.

It is apparent that capacitor 142 will discharge whenever transistor 137 is driven "on" by an activating pulse. At the conclusion of each activating pulse, the capacitor 142 recharges through the resistor 138a and diode 143, and the charging current keeps the transistor 137 active until capacitor 142 has regained its normal charge. The resistor 139, which shunts charging current from the emitter-base junction of transistor 137, determines the turnoff time of the transistor, and its resistance value preferably is so selected that this "dropout" time is equal to approximately 9 milliseconds. In other words, the capacitor 142 requires 9 milliseconds (in the absence of an activating pulse from the unijunction transistor 130 during this period of time) to attain a charge which will enable the emitter-base junction of transistor 137 to be dominated by its normal reverse bias.

Every time the unijunction transistor 130 operates, it provides an activating pulse which drives the transistor 137 into saturation, thereby completely discharging the capacitor 142 and "resetting" the time delay dropout circuitry. So long as these turn-on incidents recur at intervals of less than 9 milliseconds, the capacitor 142 is repeatedly discharged before the transistor 137 has an opportunity to turn off, and the signal being produced at the output terminal 4b will consequently remain continuously on. This is the case whenever a voltage impulse of at least 4-millisecond duration is applied to the input terminal 4a of the T4 circuit within a 5-millisecond interval following each unijunction transistor firing. Hence the T4 circuit (component 81), when turned on, derives a sustained output signal in response to intervals or gaps shorter than 5 milliseconds between successive energizing impulses per half cycle, which condition is assured upon the occurrence of an internal ground fault because the operating and polarizing quantities are then substantially in phase and the energization of 81 is virtually continuous.

Returning now to FIG. 3, it will be seen that there are two branches emanating from the output terminal 4b of the component 81 (the above-described T4 circuit). One branch is connected to the terminal 38b, and the output signal of component 81 at this terminal comprises the "stopping signal" referred to hereinbefore. The second branch is connected through a current limiting resistor 146 to the base electrode of an NPN transistor 145 which is part of the AND logic unit 42, and by this means the component 81 supplies a "control signal" to the unit 42. The AND unit 42 responds to this control signal, when enabled by the coordinating signal from the time delay means T.D., to develop at terminal 38c the first operating signal which will attempt to initiate tripping of the circuit interrupter at the local terminal of the electric power transmission line.

Before proceeding with the detail description of FIG. 3, it should be noted that the basic operating principle employed by GD (the measuring component 81 in conjunction with the coincidence circuit 79) in responding to in-flowing ground current, as described above, follows the teachings of the previously cited Patent No. 2,879,453, Hodges et al.

As can be seen in FIG. 3, the AND unit 42 comprises another NPN transistor 147 disposed in tandem with the above-mentioned transistor 145. The emitter of transistor 147 is connected directly to the negative bias bus R', while its base electrode is connected through a current limiting resistor 148 to the OR logic unit 88 for energization by the coordinating signal. The collector of transistor 147 and the emitter of transistor 145 are interconnected as shown, while the collector of the latter transistor is connected to the supply voltage bus S by way of a load impedance comprising a pair of resistors 150a and 150b in series. A base resistor 151 is connected between the base electrode of transistor 145 and the reference bus R, and a base resistor 152 is similarly connected between the base electrode of transistor 147 and the reference bus.

In the absence of either a control signal or a coordinating signal (or both), at least one of the transistors 145 and 147 will be in a non-conductive state (inactive), and hence there is negligible voltage drop across load resistor 150b. But whenever both signals are present, these transistors are concurrently active and their serially connected emitter-collector circuits readily conduct load current, whereby the potential at the junction between resistors 150a and 150b becomes appreciably negative with respect to the supply voltage bus S. This junction is connected to the base electrode of a normally inactive PNP transistor 153 whose emitter is connected directly to the positive bias bus S' and whose collector is connected to the reference bus R through two voltage dividing resistors 154a and 154b, the latter having a much larger resistance values than the former. A portion of the load current conducted jointly by the transistors 145 and 147 will follow a path through the emitter-base junction of transistor 153, thereby forward biasing the same, and the latter transistor is accordingly turned on. When transistor 153 is turned on, its collector current produces across resistor 154b a positive output voltage of substantially constant magnitude nearly equal to the magnitude of the supply voltage. This output voltage is applied to terminal 38c and comprises the first operating signal referred to hereinbefore.

The coordinating signal required to activate the transistor 147 of the above-described AND unit 42 is derived alternatively from the time delay means T.D. or from the third ground fault responsive means G3 which energizes the terminal 74a when operating (see FIG. 2). These two coordinating-signal sources are connected in parallel to transistor 147 by way of diodes 155 and 156, respectively, which diodes comprise the OR unit 88 as it is shown in FIG. 3.

The time delay means T.D. in FIG. 3 has been illustrated in essentially the same manner as in the previously described FIG. 2, with a pair of diodes 157 and 158 being shown for the OR logic unit 86. Its measuring component 84 is connected to the junction between resistors 112a and 112b for energization by the output voltage which is produced across resistor 112b whenever the AND unit 82 in the coincidence circuit 79 is turned on, this energization being in the form of successive blocks of voltage subsisting during zero-phase-sequence line current half cycles of given polarity. The other measuring component 85 is connected to terminal 74f for energization by a similar succession of voltage blocks derived by the companion coincidence circuit 78 during zero-phase-sequence line current half cycles of opposite polarity. Both of the components 84 and 85, as explained hereinbefore, are time delay pickup and dropout devices, and preferably each comprises the T4 circuit which has been shown in FIG. 4 and described above.

The measuring components 84 and 85 are each operative to produce an output signal, after a minimum initial delay of 4 milliseconds, when energized in response to zero-phase-sequence line current of power frequency (60 c.p.s.). The respective output signals are channeled through diodes 157 and 158 to an input terminal 5a of the common timing component 87 which is energized thereby. The timing component 87 is arranged to turn on when a definite interval of 2 milliseconds has elapsed following the delayed operation of whichever measuring component (84 or 85) operates first, whereby the minimum interval of time required by T.D. to produce its coordinating signal following zero-phase-sequence line current inception will be 6 milliseconds.

The timing component 87, which is represented in FIG. 3 by the block labeled "T5," preferably comprises the time delay pickup and instantaneous dropout circuit shown in FIG. 5. This circuit is the claimed subject matter of a copending patent application S.N. 321,072, Scharf, filed November 4, 1963, and assigned to the assignee of the present application.

The time delay pickup function of the T5 circuit is achieved in the same manner as the corresponding function is achieved in the T4 circuit previously described. (FIG. 4). It therefore will be observed in FIG. 5 that the first portion of the circuit is essentially a duplicate of the first portion of the circut shown in FIG. 4. By appropriately adjusting the rheostat 127 of the energy storing circuit in FIG. 5, the critical firing level of the level-detecting unijunction transistor 130 is attained when the input terminal 5a has been energized continuously for an interval of just 2 milliseconds. The remaining part of the circuit (to the right of the coupling capacitor 134 in FIG. 5) differs from FIG. 4 and will now be described in detail.

As can be seen in FIG. 5, the coupling capacitor 134, with an appropriately poled diode 161, is connected between base-one of the unijunction transistor 130 and the base electrode of an NPN transistor 162. A base resistor 163 is connected between the base electrode of transistor 162 and the reference bus R, and the junction of capacitor 134 and diode 161 is tied to the reference bus by another resistor 163a. The emitter of transistor 162 is connected to the collector of an additional NPN transistor 164 with which it is disposed in tandem. The emitter of transistor 164 is connected in turn to the negative bias bus R', while the collector of transistor 162 is connected to the supply voltage bus S through a load impedance comprising a pair of resistors 165a and 165b in series. Whenever the unijunction transistor 130 fires, it produces a voltage pulse which is applied, via the coupling capacitor 134, to the base electrode of transistor 162, and transistor 162 is forward biased thereby.

The base electrode of the second transistor 164 is connected by way of a current limiting resistor 166 to the input terminal 5a of the T5 circuit for energization simultaneously with energization of the energy storing circuit 127, 128. A base resistor 167 is connected between this base electrode and the reference bus. It is apparent in FIG. 5 that the transistor 164 is rendered conductive (active) only when an input signal is applied to terminal 5a. However, no significant amount of current can be conducted by transistor 164 until the companion transistor 162 is also activated, which occurs upon operation of the unijunction transistor 130 two milliseconds after the input signal is initially applied.

Whenever both of the transistors 162 and 164 are concurrently active, their serially interconnected emitter-collector circuits readily conduct load current and the junction of the resistors 165a and 165b then becomes appreciably negative with respect to the supply voltage bus S. This junction is connected to a base electrode of a normally inactive PNP transistor 168 whose emitter is connected directly to the positive bias bus S' and whose collector is connected to the reference bus R through two voltage dividing resistors 169a and 169b, the latter having a much larger resistance value than the former. A portion of the load current conducted jointly by the transistors 162 and 164 will follow a path through the emitter-base junction of transistor 168, thereby forward biasing the same, and the latter transistor is accordingly turned on. When the transistor 168 is thus activated, there is derived across resistor 169b a unipolarity voltage of substantially constant magnitude nearly equal to the magnitude of supply voltage. The output terminal 5b of the T5 circuit is connected to the junction of resistors 169a and 169b, and the voltage there derived comprises the output signal which this circuit produces when on.

As is shown in FIG. 5, the transistors 162 and 168 are interconnected with positive feedback so that forward current conduction in the emitter-base junction of the former is augmented upon activation of the latter. This is accomplished by connecting the base electrode of transistor 162 to the collector of transistor 168 through a feedback resistor 170. This positive feedback circuitry contributes to a snap action response by the T5 circuit upon expiration of its 2-millisecond delay, and it prevents deactivation of transistor 162 at the conclusion of the once activated to turn on the T5 circuit, can then exercise sistor 130. It is therefore apparent that the transistor 162, no further control over the operation of this circuit, and the output signal at terminal 5b is sustained until transistor 164 is turned off upon subsequent removal or suspension of energization of the input terminal 5a. The provision of transistor 164 enables the desired instantaneous dropout function of the T5 circuit to be achieved.

FIGURES 6a AND 6b

Having fully described the preferred circuitry and operation of the logic portion 3 (FIG. 3) of the component section 2 (FIG. 2) of the ground fault directional-comparison protective relaying system shown schematically in FIG. 1, I will now describe with reference to FIGS. 6a and 6b two alternative embodiments which might be used in lieu thereof. The circuits illustrated in block form in FIGS. 6a and 6b are intended to be substitutable for the circuitry encompassed by the dash-line 3 in FIG. 2, which initial activating pulse received from the unijunction transistor circuitry comprises the ground directional means GD and the time delay means T.D. of my relaying system. Although each of the alternative circuits is arranged differently than the corresponding portion of FIG. 2, its function in the relaying scheme is unchanged.

Referring now to FIG. 6a, the circuit there shown includes ground current directional discriminating means 180, 181 disposed for energization by the A.-C. operating and reference voltages which are derived, respectively, from zero-phase-sequence line current and from the zero-phase sequence polarizing quantity. This means actually comprises two identical sets of components 180 and 181 arranged for alternate response during "positive" and "negative" half cycles, respectively, of the quantities supplied thereto. For the sake of drawing simplicity, only the latter set is revealed in detail in FIG. 6a, the former being the same except for its connection to the obverse poles or ends of the operating and reference voltage sources.

The component set 181 includes an AND logic unit 182 having two inputs connected to the terminals 74d and 74b for energization, respectively, by the G1 supervising signal and the operating voltage impulses which are applied to these terminals. The unit 182 is turned on while the supervising signal is present and the input from terminal 74b is concurrently positive (relative to the reference bus R). As is shown in FIG. 6a, the output of this unit supplies an input signal for another AND logic unit 183 which is additionally connected to terminal 74c for energization by the reference voltage impulses applied thereto. The unit 183 performs a polarity coincidence detecting function. It develops a train of unipolarity voltage impulses having periods of duration corresponding to the periods during which the AND unit 182 is "on" and the input from terminal 74c is concurrently positive (relative to the reference bus R). Thus the voltage impulses comprising the output of unit 183 will recur at one cycle intervals, and the duration of each is a measure of the phase relationship between the A.-C. operating and reference voltages during half cycles of given polarity.

This output of the AND unit 183 supplies a succeeding measuring means 184 which operates to produce a control signal whenever any one of the voltage impulses supplied thereto persist for longer than the duration of approximately one-fourth of a power frequency cycle (4 milliseconds in a 60 c.p.s. system). The measuring means 184, which is shown in FIG. 6a as a component labeled "T4," comprises a time delay pickup and dropout circuit such as that illustrated in FIG. 4 and described hereinbefore. It is preferably the same as the measuring component 81 previously described in connection with FIG. 2.

The control signal produced by the measuring means 184, when turned on in response to energization by a voltage impulse from the unit 183 of sufficient duration, serves as one input to an OR logic unit 186. As can be seen in FIG. 6a, an alternative input for the OR unit 186 is taken from the companion set of components 180 which provides a similar control signal whenever G1 is picked up and the A.-C. operating and reference voltages have been in continuous polarity agreement for longer than 4 milliseconds during an opposite-polarity half cycle of the operating voltage. The output of the OR unit 186 is connected to terminal 38b, and whenever this unit is energized by either one of its input control signals the above-mentioned stopping signal is developed at the terminal 38b. The FIG. 6a arrangement is therefore operative in response to continuous polarity coincidence for longer than approximately one-fourth of a power frequency cycle between the operating and reference voltages during any half cycle thereof. Since these two voltages are substantially in phase whenever ground current is flowing toward a fault on the protected-line side of the local terminal of the transmission line, it is apparent that the stopping signal reflects in-flowing zero-phase-sequence line current.

The output of the OR unit 186 of the ground current directional discriminating means shown in FIG. 6a also provides an input for associated time delay means comprising a timing component 187. The timing component 187, shown in FIG. 6a as a block labeled "T5," is a time delay pickup and instantaneous dropout circuit such as that illustrated in FIG. 5 and described hereinbefore. It is preferably the same as the timing component 87 previously described in connection with FIG. 2, and it turns on when continuously energized for a definite interval of time (such as 2 milliseconds). When "on," the output of component 187 is conveyed via an OR logic unit 188 to terminal 38c at which the above-mentioned first operating signal is consequently developed. An alternative input to the OR unit 188 is supplied by an AND logic unit 189 which is connected to terminal 74a and to the OR unit 186 for energization, respectively, by the G3 coordinating signal and the output of 186, whereby the timing component 187 is bypassed by the third ground fault responsive means G3 upon operation thereof.

It is apparent that on the inception of a ground fault (assuming the fault is not so severe as to cause G3 operation) the timing component 187 in the FIG. 6a arrangement will prevent production of the operating signal at terminal 38c until 2 milliseconds have elapsed following operation of either one of the component sets 180 or 181. Neither one of these sets can operate before an initial interval of at least 4 milliseconds has elapsed following fault inception. Hence I have obtained the desired 6-millisecond minimum time delay (the reasons for which were explained hereinbefore) in the production of the first operating signal.

The initial minimum time delay of 4 milliseconds in the FIG. 6a arrangement is introduced by the measuring component 184 of the ground current directional discriminating means. It will be observed that this component performs the desired frequency checking function which, in the preferred embodiment shown in FIG. 2, is provided in the time delay means T.D. While the circuit illustrated in FIG. 6a is functionally equivalent to and appears more simple than the preferred embodiment of my invention, it is not preferred because its *maximum* possible operating delay is longer. This is attributable to the use of separate measuring components (184) for the respective coincidence detecting circuits responsive to alternate polarities of the operating and reference voltages. As an illustration, assume that the angle of incidence of an internal ground fault is such that the measuring component 184 is immediately energized by a voltage impulse which subsequently expires just shortly before the 4-millisecond interval required for operation. As a result, no input will be supplied to the OR unit 186 until the companion component set 180 operates approximately 4 milliseconds after the expiration of this initial period of inaction, whereby the stopping signal in FIG. 6a may be delayed as much as 8 milliseconds after fault inception.

Referring next to FIG. 6b, the circuit there shown includes ground current directional discriminating means 180', 181' which is similar in most respects to the corresponding part 180, 181 of FIG. 6a. The only difference is an internal one involving the respective inputs to the two AND logic units which are so arranged in FIG. 6b that the polarity coincidence detecting function is performed ahead of the supervision function.

Toward this end, the AND unit 182' is connected to the terminals 74b and 74c for energization, respectively, by the A.-C. operating and reference voltages, whereby it produces a resultant output signal during that portion of every power-frequency cycle when both of the terminals 74b and 74c are simultaneously positive (relative to the reference bus R). The AND unit 183' in FIG. 6b derives its two inputs respectively from the output of 182, and from terminal 74d which is energized by the G1 supervising signal. Hence the AND unit 183' is operative only when G1 picks up and 182' is on, and it will develop a train of unipolarity voltage impulses or signals recurring at one-cycle intervals and having periods of duration corresponding to the periods of overlap between operating voltage and reference voltage half cycles of a given polarity. This train of voltage impulses is supplied to measuring means 184 which operatively responds to the persistence for longer than 4 milliseconds of any one of the impulses, and the output of the measuring means provides input to an OR logic unit 186. The remainder of the FIG. 6b arrangement is constructed and operates the same as the corresponding portion of FIG. 6a, previously described.

FIGURE 7

FIG. 7 is a detailed circuit diagram of the control circuit 7 which is shown schematically in FIG. 1. Although this circuit has been generally described hereinbefore, a detailed showing and description is included here in order to complete the present disclosure.

As can be seen in FIG. 7, the AND logic unit 45 of the illustrated control circuit comprises an NPN transistor 191. The base electrode of transistor 191 is connected through series resistors 192 and 193 to the input terminal 44a for energization by the above-mentioned operating signal which is applied to this terminal of the circuit. A base resistor 192a is connected between the base electrode of the transistor 191 and the reference bus R. The emitter of this transistor is connected directly to the negative bias bus R', while its collector is connected to the supply voltage bus S by way of a load impedance comprising a pair of resistors 194a and 194b in series. The junction between resistors 194a and 194b is connected to the base electrode of a normally inactive PNP transistor 195 whose emitter is connected to the positive bias bus S' and whose collector is connected through two voltage dividing resistors 196a and 196b to the reference bus R, resistor 196b having a much greater resistance value than resistor 196a. Whenever the transistor 191 is active, a portion of its collector current will follow a path through the emitter-base junction of transistor 195, thereby forward biasing the same, and the latter transistor is turned on and off simultaneously with the former. The transistor 191 is turned on (activated) when its base electrode is energized by the first operating signal received from the input terminal 44a.

Activation of transistor 191 in response to energization of the input terminal 44a can be prevented by the NOT logic unit 47 of the FIG. 7 control circuit. This unit comprises a normally inactive NPN transistor 197 whose emitter-collector circuit is connected in parallel relationship with the emitter-base junction of transistor 191. A base resistor is connected between the base electrode of transistor 197 and the reference bus, and a current limiting resistor 199 connects the base electrode to the input terminal 44b of the control circuit. The input terminal 44b, as explained hereinbefore, is energized by a blocking signal received from the local carrier-current receiver RM when the receiver is receiving carrier current from an active remote transmitter. The presence of the blocking signal (which comprises a continuous D.-C. voltage that is positive with respect to the reference bus and has a suitably large magnitude) will turn on the transistor 197. Whenever this transistor is on, its emitter-collector circuit is in a low impedance state, whereby the potential at the junction of resistors 192 and 193 cannot significantly exceed the level of the negative bias bus R'. As a result, any energizing signal applied to the terminal 44a is bypassed to R' without effecting forward bias of the transistor 191, and the transistor 191 is maintained off (inactive). It is therefore apparent that the AND unit 45 is rendered inoperative upon energization of the input terminal 44b by the blocking signal.

Whenever an energizing signal is applied to terminal 44a in the absence of a blocking signal at terminal 44b, the transistor 191 is activated and the inverting transistor 195 is enabled to turn on. The resulting collector current of transistor 195 then produces across resistor 196b a unipolarity voltage signal of substantially constant magnitude nearly equal to the magnitude of the supply voltage. This voltage signal is utilized to energize a timing component 200 which is shown in FIG. 7 as a block labeled "T5."

The timing component 200, whose input is taken from the junction of resistors 196a and 196b, is a time delay pickup and instantaneous dropout circuit such as that illustrated in FIG. 5 and described hereinbefore. It is adjusted to turn on when continuously energized for an interval of 3 milliseconds. The output signal produced by component 200 upon expiration of this short time delay provides an input to the succeeding AND logic unit 48.

As can be seen in FIG. 7, the AND unit 48 comprises two NPN transistors 201 and 203 disposed in tandem with each other. The emitter of transistor 203 is connected directly to the negative bias bus R', while its collector and the emitter of transistor 201 are interconnected as shown. The collector of transistor 201 is connected to the supply voltage bus S by way of a load impedance comprising a pair of resistors 204a and 204b in series. A base resistor 205 is connected between the base electrode of transistor 201 and the reference bus R, and a base resistor 206 is similarly connected between the base electrode of transistor 203 and the reference bus.

The base electrode of the transistor 201 is connected through a current limiting resistor 207 to the timing component 200 for energization by its output signal. The base electrode of the transistor 203 is connected through a current limiting resistor 208 to the input terminal 44c of the control circuit, which terminal, as explained hereinbefore, will be energized upon operation of either of the second and third ground fault responsive means G2 and G3. (The signal which G2 supplies to terminal 44c comprises an intermittent D.-C. voltage that is positive with respect to the reference bus and has a magnitude nearly equal to the magnitude of the supply voltage.)

In the absence of an output signal from the timing component 200, or in the absence of any signal at the terminal 44c, at least one of the transistors 201 and 203 will be in a non-conductive state (inactive), and hence there is negligible voltage drop across load resistor 204b. But with both signals present, indicating the contemporaneous presence of the first operating signal at terminal 44a and either the second coordinating or second operating signal at terminal 44c, these transistors are concurrently active and their serially connected emitter-collector circuits readily conduct load current, whereby the potential at the junction between resistors 204a and 204b becomes appreciably negative with respect to the supply voltage bus S. This junction is connected to the base electrode of a normally inactive PNP transistor 209 whose emitter is connected directly to the positive bias bus S' and whose collector is connected to the reference bus R through two voltage dividing resistors 210a and 210b, the latter having a much larger resistance value than the former. A portion of the load current conducted jointly by the transistors 201 and 203 will follow a path through the emitter-base junction of transistor 209, thereby forward biasing the same, and the latter transistor is accordingly turned on. When the transistor 209 is turned on, its collector current produces across resistor 210b a positive voltage of substantially constant magnitude nearly equal to the magnitude of the supply voltage, and this output voltage of the AND unit 48 comprises the "tripping signal" referred to hereinbefore.

The tripping signal taken from the junction of resistors 210a and 210b is utilized to initiate operation of the static switch CR. This switch comprises a solid state controlled rectifier 211 which connects terminal 50 of the control circuit to the positive terminal of the station battery. The controlled rectifier 211 is "closed" upon activation or firing of a unijunction transistor 212 associated therewith. As is shown in FIG. 7, the emitter of the unijunction transistor 212 is connected to the aforesaid junction by way of a current limiting resistor 213, whereby the unijunction transistor will be operatively energized by the tripping signal which the AND unit 48 there produces.

As can be seen in FIG. 7, base-one of the unijunction transistor 212 is connected through a resistor 214 to the reference bus R, while base-two is connected through a resistor 215 to the supply voltage bus S. An integrating capacitor 216 interconnects the unijunction transistor emitter and the reference bus, whereby the unijunction transistor 212 cannot fire spontaneously in response to the production of a tripping signal. This capacitor is arranged to delay firing of 212 for a momentary time delay of approximately 0.5 millisecond, and its purpose is to prevent misoperation of the static switch CR in response to stray signals of shorter duration.

Base-two of the unijunction transistor 212 is connected through a current limiting resistor 218 to the base electrode of a normally inactive PNP transistor 219 whose emitter is connected directly to the positive bias bus S' and whose collector is connected to the reference bus R through a load impedance, comprising the primary winding of a pulse transformer 220 in series with a resistor 221. A normally charged capacitor 222 is connected between the positive bias bus and the resistor 221, and a diode 223 poled as shown is connected in shunt with the primary winding of the pulse transformer 220. The secondary winding of this transformer is connected between the cathode and gate electrode of the controlled rectifier 211. As can be seen in FIG. 7, the relatively positive and negative electrodes (the anode and cathode) of the controlled rectifier are connected, respectively, to the positive terminal of the station battery and to terminal 50 of the illustrated control circuit.

Until triggered or activated by a small "gate" current in its gate electrode 211a, the controlled rectifier 211 blocks current flow in both directions and hence is in effect an open circuit. When so triggered, however, it will abruptly change to a low-forward-impedance state which enables energizing current to flow in the electroresponsive device connected to terminal 50. Its anode current then exceeds a predetermined minimum value (the "holding current") required to sustain conduction in a controlled rectifier of the type illustrated, and this unit will remain active until the connected circuit is opened externally (by the auxiliary contact 18 of the circuit interrupter 13, FIG. 1), even if the gate signal were quickly removed.

The gate current required to trigger the controlled rectifier 211 is derived from the secondary winding of the pulse transformer 220. Under normal steady-state conditions, the transistor 219 is inactive, the capacitor 222 is fully charged and no signal is induced in the pulse transformer secondary. However, when the associated unijunction transistor 212 fires in response to the above-mentioned tripping signal, the abrupt increase in its base-to-base current will effect forward bias of the emitter-base junction of transistor 219 which is activated thereby. The emitter-collector circuit of this transistor when thus activated permits the capacitor 222 to quickly discharge through the primary winding of the pulse transformer 220, and the resulting increase in primary current induces, in the secondary winding, gate current in the proper direction and of appropriate magnitude and duration to trigger the controlled rectifier 211. The diode 223 serves to limit the peak secondary voltage which can be induced in the pulse transformer, upon subsequent deactivation of the transistor 219, to less than the maximum permissible reverse gate voltage of the controlled rectifier 211.

Since the controlled rectifier 211 is very fast and sensitive, and only a small gate signal is required to trigger it, it is important to prevent stray voltage transients or surges originating in external sources from activating the static switch at some impropitious moment. Toward ths end, the gate circuit of the controlled rectifier is provided with a surge suppressing capacitor 224 of small capacitance, and in addition, as can be seen in FIG. 7, the anode-cathode circuit has a surge suppressing series combination of a resistor 225 and a capacitor 226 connected thereacross. It will be recognized by those skilled in the art that these surge suppressing arrangements will absorb short-term transient surges, thereby ensuring that the controlled rectifier will not be fired except, as described above, in response to a genuine tripping signal produced by the AND unit 48.

While I have shown and described preferred forms of my invention by way of illustration, various modifications will occur to those skilled in the art. I contemplate therefore by the claims which conclude this specification to cover all such modifications as fall within the true spirit and scope of my invention.

What I claim as new and desire to secure by Letters Patent of the United States is:

1. A directional comparison protective relaying system for initiating a predetermined control function in response to the occurrence of a ground fault on a polyphase A.-C. electric power transmission line having distantly spaced terminals at each of which are located signal transmitting and receiving means so arranged that the transmitting means at each terminal can communicate with the receiving means at any of said terminals remote therefrom, comprising at each of the line terminals:
    (a) first ground fault responsive means adapted to be coupled to the line and to the local transmitting means for activating said transmitting means when the magnitude of the zero-phase-sequence component of line current exceeds a predetermined first amount;
    (b) ground current directional sensing means connected to the first ground fault responsive means and adapted to be coupled to the line for operation in response to zero-phase-sequence line current of a magnitude exceeding said first amount flowing toward a ground fault located on the protected-line side of the local terminal;
    (c) first control means for connecting the ground current directional sensing means to the local transmitting means to deactivate said transmitting means in response to operation of said sensing means;
    (d) second ground fault responsive means adapted to be coupled to the line for operation when the magnitude of zero-phase-sequence line current exceeds a predetermined second amount which is greater than said first amount; and
    (e) second control means connected to both said sensing means and said second ground fault responsive means and responsive to their contemporaneous operations for effecting initiation of the predetermined control function, said second control means additionally being adapted to be connected to the local receiving means and being so arranged as to be rendered ineffective to initiate said control function whenever said receiving means is receiving a signal from an active remote transmitting means.

2. The protective relaying system of claim 1 in which the ground current directional sensing means (subheading b) comprises:
    (i) means adapted to be coupled to the line for deriving from zero-phase sequence line current a first A.-C. voltage and from a zero-phase-sequence polarizing electric quantity a second A.-C. voltage, said voltages being substantially in phase with each other whenever zero-phase-sequence line current is flowing toward a ground fault located on the protective-line side of the local terminal.
    (ii) discriminating means supplied by said A.-C. voltages and connected to the first ground fault responsive means, said discriminating means being effective only when the magnitude of zero-phase-sequence line current exceeds said predetermined first amount for developing a train of unipolarity voltage impulses having periods of duration dependent upon the periods of polarity coincidence between said first and second A.-C. voltages, and (iii) measuring means supplied by said train for operation whenever any one of the voltage impulses persists for longer than the duration of approximately one-quarter of a power frequency cycle.

3. A directional comparison protective relaying system for initiating a predetermined control function in response to the occurrence of a fault on a polyphase A.-C. electric power transmission line having distantly spaced terminals at each of which are located signal transmitting and receiving means so arranged that the transmitting means at each terminal can communicate with the receiving means at any of said terminals remote therefrom, comprising at each of the line terminals:

(a) first means adapted to be coupled to the line and to the local transmitting means for activating said transmitting means when the magnitude of a predetermined phase-sequence component of line current exceeds a predetermined first amount;

(b) second means adapted to be coupled to the line and to the local receiving means, said second means being operative in response to said line current component of a magnitude exceeding a predetermined second amount flowing toward a fault on the protected line to initiate the predetermined control function unless said receiving means is receiving a signal from an active remote transmitting means;

(c) said second means including time delay means so arranged as to prevent said operation of the second means on the inception of the fault, said time delay means being responsive to said component of line current of power frequency and unresponsive to the higher frequency transient line-energizing current for enabling the second means to operate after a predetermined minimum time interval has elapsed following fault inception, said predetermined time interval not beginning under line energizing conditions; and (d) third means associated with said second means and adapted to be connected to said transmitting means for deactivating the transmitting means in response to a fault occurring on the protected line.

4. The protective relaying system of claim 3 including additional means associated with said second means and adapted to be coupled to the line, said additional means being arranged to enable the second means to operate before said predetermined time interval elapses whenever the magnitude of said line current component exceeds a predetermined third amount which is greater than said second amount.

5. A ground fault responsive protective relaying arrangement for a polyphase A.-C. electric power transmission line comprising:

(a) first means adapted to be coupled to the line for operation when the magnitude of the zero-phase-sequence component of line current exceeds a predetermined amount;

(b) second means adapted to be coupled to the line and connected to said first means for operation in delayed response to operation of the first means only if zero-phase-sequence line current is flowing in a direction toward a ground fault on the protected line;

(c) said second means including time delay means so arranged as to prevent immediate operation of the second means upon operation of said first means, said time delay means being responsive to zero-phase-sequence line current of power frequency and unresponsive to the higher frequency transient line-energizing current for enabling the second means to operate only after a predetermined minimum time interval has elapsed following operation of the first means, said predetermined time interval not beginning under line energizing conditions; and (d) third means connected to said second means and responsive to the operation thereof for initiating a predetermined control function.

6. A directional comparison protective relaying system for initiating a predetermined control function in response to the occurrence of a ground fault on a polyphase A.-C. electric power transmission line having distantly spaced terminals at each of which are located signal transmitting and receiving means so arranged that the transmitting means at each terminal can communicate with the receiving means at any of said terminals remote therefrom, comprising at each of the line termnals:

(a) first ground fault responsive means adapted to be coupled to the line and to the local transmitting means, said fault responsive means being operative to activate said transmitting means in response to the instantaneous magnitude of the zero-phase-sequence component of line current exceeding a predetermined first amount;

(b) ground current directional discriminating means adapted to be coupled to the line for operation in response to zero-phase-sequence line current flowing toward a ground fault located on the protected-line side of the local terminal;

(c) first control means adapted to connect the ground current directional discriminating means to the local transmitting means for deactivating said transmitting means in response to operation of said discriminating means;

(d) time delay means connected to the first ground fault responsive means for producing a coordinating signal after the expiration of a predetermined minimum time delay following operation of said fault responsive means, said time delay means being so arranged that said predetermined time delay will not commence on the advent of zero-phase-sequence transient line-energizing current;

(e) means associated with said discriminating means and said time delay means for producing a first operating signal in response to production of said coordinating signal and simultaneous operation of said discriminating means;

(f) second ground fault responsive means adapted to be coupled to the line for producing a second operating signal when the instantaneous magnitude of zero-phase-sequence line current exceeds a predetermined second amount which is greater than said first amount and for suspending the second operating signal in substantially instantaneous response to zero-phase-sequence line current subsequently decreasing below said predetermined second amount; and (g) second control means supplied by said first and second operating signals and responsive to their contemporaneous presence for effecting initiation of the predetermined control function, said second control means additionally being adapted to be connected to the local receiving means and being so arranged as to be rendered ineffective to initiate said control function whenever an active remote transmitting means is communicating with said receiving means.

7. A ground fault responsive protective relaying arrangement for a polyphase A.-C. electric power transmission line comprising:

(a) first fault detecting means adapted to be coupled to the line for response to the zero-phase-sequence component of line current, said fault detecting means becoming operative when the magnitude of said zero-phase-sequence line current exceeds a predetermined first amount;

(b) directional discriminating means adapted to be coupled to the line and connected to the first fault detecting means, said directional discriminating means being operative to produce a control signal upon operation of said fault detecting means if zero-phase-sequence line current is flowing toward a ground fault on the protected line;

(c) time delay means adapted to be coupled to the line and connected to the first fault detecting means, said time delay means being operative to produce a first coordinating signal after the expiration of a predetermined minimum time delay following operation of said fault detecting means and being so arranged that said predetermined time delay will not commence on the advent of zero-phase-sequence transient line-energizing current;

(d) second fault detecting means adapted to be coupled to the line to produce a second coordinating signal when the magnitude of zero-phase-sequence line current exceeds a predetermined second amount which is greater than said first amount; and (e) means associated with said directional discriminating means, said time delay means and said second fault detecting means for developing an operating signal only in response to the contemporaneous prodirection of said control signal and either one of said first and second coordinating signals.

8. A directional comparison protective relaying system for initiating a predetermined control function in response to the occurrence of a ground fault on a polyphase A.-C. electric power transmission line having distantly spaced terminals, with signal transmitting and receiving means located at each of said terminals being so arranged that the transmitting means at any terminal can communicate with the receiving means at each of said terminals remote therefrom, comprising at each of the line terminals:

(a) first means adapted to be coupled to the line and to the local transmitting means for activating said transmitting means when the magnitude of the zero-phase-sequence component of line current exceeds a predetermined first amount;

(b) second means adapted to be coupled to the line and to the local receiving means, said second means being operative in response to zero-phase-sequence line current of a magnitude exceeding a predetermined second amount flowing toward a ground fault on the protected line to initiate the predetermined control function unless said receiving means is receiving a signal from an active remote transmitting means, (c) said second means including time delay means so arranged as to prevent operation of the second means on the inception of a ground fault and for a predetermined minimum length of time thereafter, said time delay means comprising (i) a first component arranged to operate when a zero-phase-sequence line current half cycle of predetermined polarity persists for a first interval of time following ground fault inception, said first interval being longer than any half cycle of zero-phase-sequence transient line-energizing current, and (ii) a second component connected to the first component and arranged to enable said second means to operate when a second interval of time has elapsed following operation of said first component, said second time interval plus said first time interval being equal to said predetermined minimum length of time; and (d) third means associated with said second means and adapted to be connected to said transmitting means for deactivating the transmitting means in response to a ground fault occurring on the protected line.

9. The directional comparison protective relaying system of claim 8 in which the time delay means (subparagraph c) additionally includes a third component arranged to operate when a zero-phase-sequence line current half cycle of polarity opposite to said predetermined polarity persists for said first interval of time following ground fault inception, and in which the second component of the time delay means is connected to both of said first and third components and is arranged to enable the second means to operate when said second interval of time elapses following operation of either one of said first and third components.

10. A directional comparison protective relaying system for initiating a predetermined control function in response to the occurrence of a fault on a polyphase A.-C. electric power transmission line having distantly spaced terminals, with signal transmitting and receiving means being located at each of said terminals and being so arranged that the transmitting means at any terminal can communicate with the receiving means at each of said terminals remote therefrom, comprising at each of the line terminals:

(a) first fault responsive means adapted to be coupled to the line and to the local transmitting means, said fault responsive means being operative to activate said transmitting means in response to the instantaneous magnitude of a predetermined phase-sequence component of line current exceeding a predetermined first amount;

(b) directional discriminating means adapted to be coupled to the line for operation in response to said line current component flowing toward a fault located on the protected-line side of the local terminal;

(c) first control means adapted to connect the directional discriminating means to the local transmitting means for deactivating said transmitting means in response to operation of said discriminating means;

(d) time delay means associated with said discriminating means and responsive to the inception of said fault for producing a coordinating signal after the expiration of a predetermined minimum time delay following fault inception, said time delay means including (i) a measuring component arranged to operate, following fault inception, whenever the duration of a half cycle of said component of line current exceeds a first interval of time longer than any half cycle of transient line-energizing current, and (ii) a timing component connected to the measuring component and arranged to produce the coordinating signal when a second interval of time elapses following operation of said measuring component, the sum of said first and second time intervals being equal to the length of said predetermined time delay;

(e) means associated with said discriminating means and said time delay means for producing a first operating signal in response to production of said coordinating signal and simultaneous operation of said discriminating means;

(f) second fault responsive means adapted to be coupled to the line for producing a second operating signal when the instantaneous magnitude of said line current component exceeds a predetermined second amount; and (g) second control means supplied by said first and second operating signals and adapted to be coupled to the local receiving means, said second control means being responsive to the contemporaneous presence of said first and second operating signals for effecting initiation of the predetermined control function unless an active remote transmitting means is communicating with said receiving means.

11. The directional comparison protective relaying system of claim 10 in which the second fault responsive means is arranged to suspend the second operating signal in substantially instantaneous response to the predetermined component of line current decreasing to an instantaneous magnitude less than said predetermined second amount.

12. A ground fault responsive protective relaying arrangement for a polyphase A.-C. electric power transmission line comprising:

(a) directional discriminating means adapted to be coupled to the line to produce a control signal in response to the zero-phase-sequence component of line current flowing in a direction toward a ground fault on the protected line;

(b) first fault detecting means adapted to be coupled to the line to produce a voltage signal in response to the instantaneous magnitude of zero-phase-sequence line current exceeding a predetermined first amount;

(c) time delay means adapted to be coupled to the line and connected to said first fault detecting means to produce a first coordinating signal after the expiration of a predetermined minimum time delay following energization by said voltage signal, said time delay means including
  (i) a measuring component arranged to operate upon energization by said voltage signal as soon as the duration of a zero-phase-sequence line current half cycle exceeds a first interval of time, and
  (ii) a timing component connected to the measuring component and arranged to produce the first coordinating signal when a second interval of time elapses following operation of said measuring component, the sum of said first and second time intervals being equal to the length of said predetermined time delay;

(d) second fault detecting means adapted to be coupled to the line to produce a second coordinating signal in response to the instantaneous magnitude of zero-phase-sequence line current exceeding a predetermined second amount which is greater than said first amount; and (e) means connected to said directional discriminating means, to said time delay means and to said second fault detecting means for developing an operating signal only in response to being simultaneously energized by said control signal and either one of said first and second coordinating signals.

13. A directional comparison protective relaying system for initiating a predetermined control function in response to the occurrence of a ground fault on a polyphase A.-C. electric power transmission line having distantly spaced terminals, with signal transmitting and receiving means being located at each terminal and being so arranged that the transmitting means at any terminal can communicate with the receiving means at each of said terminals remote therefrom, comprising at each of the line terminals:

(a) first ground fault responsive means adapted to be coupled to the line and to the local transmitting means, said first means being operative to activate said transmitting means when the magnitude of the zero-phase-sequence component of line current exceeds a predetermined first amount;

(b) means comprising means adapted to be coupled to the line for deriving two A.-C. voltages from zero-phase-sequence line current and from a zero-phase-sequence polarizing electric quantity, respectively, said two voltages being substantially in phase with each other whenever zero-phase-sequence line current is flowing toward a ground fault on the protected-line side of the local terminal, said ground current directional discriminating means being arranged for operation in response to continuous polarity coincidence for longer than approximately one-fourth of a power-frequency cycle between said two voltages;

(c) first control means adapted to connect the ground current directional discriminating means to the local transmitting means for deactivating said transmitting means in response to operation of said discriminating means;

(d) time delay means connected to said discriminating means for producing a first operating signal in delayed response to operation of said discriminating means;

(e) second ground fault responsive means adapted to be coupled to the line for producing a second operating signal when the magnitude of zero-phase-sequence line current exceeds a predetermined second amount; and (f) second control means supplied by both of said first and second operating signals and responsive to their contemporaneous presence for effecting initiation of the predetermined control function, said second control means being adapted to be connected to the local receiving means and being so arranged as to be rendered ineffective to initiate said control function whenever an active remote transmitting means is in communication with said receiving means.

14. The directional comparison protective relaying system of claim 13 in which the ground current directional discriminating means (subparagraph b) comprises:

(i) means for developing a first train of unipolarity voltage impulses having periods of duration corresponding to the periods during which the polarities of both of the two A.-C. voltages are coincidently positive, (ii) first measuring means supplied by said first train for producing a first control signal whenever any one of the voltage impulses of the first train persists for longer than the duration of approximately one-fourth of a power frequency cycle, (iii) means for developing a second train of unipolarity voltage impulses having periods of duration corresponding to the periods during which the polarities of both of the two A.-C. voltages are coincidently negative, (iv) second measuring means supplied by said second train for producing a second control signal whenever any one of the voltage impulses of the second train persists for longer than the duration of approximately one-fourth of a power frequency cycle, and (v) means connected to the first and second measuring means for operation in response to the production of either one of said first and second control signals.

15. A directional comparison protective relaying system for initiating a predetermined control function in response to the occurrence of a fault on a polyphase A.-C. electric power transmission line having distantly spaced terminals, with signal transmitting and receiving means being located at each terminal and being so arranged that the transmitting means at any terminal can communicate with the receiving means at each of said terminals remote therefrom, comprising at each of the line terminals:

(a) first line fault responsive means adapted to be coupled to the line and to the local transmitting means for activating said transmitting means when the magnitude of a predetermined phase-sequence component of line current exceeds a predetermined first amount;

(b) means adapted to be coupled to the line and to said transmitting means for sensing the direction of said line current component, said sensing means including means for deriving a first A.-C. voltage from said line current component and a second A.-C. voltage from a corresponding phase-sequence component of a polarizing electric quantity of the line, said first and second voltages being substantially in phase with each other whenever said line current component is flowing toward a fault on the protected-line side of the local terminal, said sensing means being operative to deactivate the transmitting means when the magnitude of said line current component exceeds said first amount and there is continuous polarity coincidence for longer than approximately one-fourth of a power frequency cycle between said first and second voltages;

(c) means connected to the sensing means and operative to produce a first operating signal after operation of the sensing means unless the frequency of said first voltage is more than twice the power frequency;

(d) second line fault responsive means adapted to be coupled to the line for producing a second operating signal when the magnitude of said line current component exceeds a predetermined second amount; and (e) means supplied by both of said first and second operating signals and adapted to be coupled to the local receiving means for effecting initiation of the predetermined control function in response to the contemporaneous presence of both operating signals unless an active remote transmitting means is in communication with said receiving means.

16. Electric control means for producing an output signal in response to an operating signal being applied thereto in the absence of a blocking signal, the control means being temporarily disabled whenever it has remained inoperative for a predetermined length of time following the application of a starting signal thereto, comprising:

(a) first means adapted to be energized by the operating signal for producing the output signal in response to energization by said operating signal;

(b) second means connected to said first means and adapted to be energized by the blocking signal which will cause activation of the second means on being applied thereto, the second means being arranged when active to render said first means ineffective to produce the output signal;

(c) timing means connected to said second means for causing activation thereof for a predetermined minimum interval of time commencing whenever the timing means has continuously been supplied by an input signal for a preceding interval of said predetermined length;

(d) third means arranged normally to produce a control signal, said third means being adapted to be energized by the operating signal for suspending said control signal in response to energization by said operating signal; and (e) fourth means connected to said timing means and to said third means, said fourth means being supplied by said control signal and being adapted to be energized by both the blocking signal and the starting signal for producing said input signal and supplying it to the timing means in response to being concurrently energized by said starting signal and either said blocking signal or said control signal.

17. A directional comparison protective relaying system for initiating a predetermined control function in response to the occurrence of a fault on a polyphase A.-C. electric power transmission line having distantly spaced terminals at each of which are located signal transmitting and receiving means so arranged that the transmitting means at each terminal can communicate with the receiving means at any of said terminals remote therefrom, comprising at each of the line terminals:

(a) fault detecting means adapted to be coupled to the line and to the local transmitting means, said fault detecting means being operative in response to the occurrence of a line fault to activate said transmitting means;

(b) directional sensing means adapted to be coupled to the line and to the local transmitting means, said sensing means being operative in response to said line fault occurring on the protected-line side of the local terminal to deactivate said transmitting means;

(c) first control means connected to the sensing means, and adapted to be coupled to the local receiving means, said first control means being responsive to operation of said sensing means for effecting initiation of the predetermined control function unless an active remote transmitting means is communicating with said receiving means;

(d) timing means connected to said first control means for disabling the first control means, thereby rendering it ineffective to initiate said control function, in response to being continuously energized by an input signal for a predetermined initial length of time and for maintaining the first control means disabled for at least a predetermined interval of time thereafter;

(e) second control means connected to said fault detecting means and to said timing means and adapted to be connected to said receiving means for supplying the input signal to said timing means whenever said fault detecting means is operating and a remote transmitting means is concurrently communicating with said receiving means; and (f) means connecting said second control means to said sensing means in parallel relationship with its connection to said receiving means for enabling it to supply said input signal to said timing means upon operation of said fault detecting means, without any concurrent communication with said receiving means, whenever said sensing means is not operating.

18. In a ground fault responsive protective relaying arrangement for a polyphase A.-C. electric power transmission line:

(a) directional sensing means adapted to be coupled to the line for producing a control signal in response to the zero-phase-sequence component of line current flowing in a given direction;

(b) a first ground fault detector adapted to be coupled to the line for producing a starting signal in response to the magnitude of said zero-phase-sequence component of line current exceeding a predetermined first amount;

(c) first means connected to said first fault detector for producing a first coordinating signal after the expiration of a predetermined time delay following production of said starting signal unless the starting signal has been produced as a result of transient line-energizing current;

(d) a second ground fault detector adapted to be coupled to the line for producing a second coordinating signal in response to the magnitude of said line current component exceeding a predetermined second amount which is greater than said first amount;

(e) second means connected to said directional sensing means, to said first means and to said second fault detector for developing a first operating signal only in response to the concurrent production of said control signal and either one of said first and second coordinating signals;

(f) third means connected to said second means for producing an output signal in delayed response to energization by said first operating signal;

(g) a blocking signal source;

(h) fourth means connected to said third means and to said blocking signal source for activation in response to energization by a blocking signal, said fourth means being arranged when active to render said third means ineffective to produce said output signal;

(i) timing means connected to said fourth means for causing activation thereof for a predetermined minimum interval of time commencing whenever the timing means has continuously been supplied by an input signal for a predetermined initial length of time;

(j) fifth means connected to said first fault detector, to said blocking signal source and to said timing means for supplying the input signal to the timing means in response to concurrent energization by both of said starting and blocking signals;

(k) sixth means connected to said second and fifth means, the sixth means being effective only in the absence of said first operating signal to enable said fifth means to supply said input signal to the timing means whenever energized by the starting signal, even without concurrent energization of said fifth means by the blocking signal;

(l) a third ground fault detector adapted to be coupled to the line for producing a second operating signal in response to the magnitude of said line current component exceeding a predetermined third amount which is greater than said first amount but less than second amount; and (m) seventh means connected to said third fault detector and to said third means for initiating a predetermined control function in response to concurrent energization by said output signal and said second operating signal.

19. A ground fault responsive protective relaying arrangement for a polyphase A.-C. electric power transmission line comprising:

(a) directional sensing means adapted to be coupled to the line for producing a control signal in response to the zero-phase-sequence component of line current flowing toward a ground fault on the protected line;

(b) first fault detecting means adapted to be coupled to the line for operation in response to the magnitude of said zero-phase-sequence line current exceeding a predetermined first amount;

(c) time delay means adapted to be coupled to the line and connected to the first fault detecting means, said time delay means being operative to produce a first coordinating signal after the expiration of a predetermined minimum time delay following operation of said fault detecting means and being so arranged that said predetermined time delay will not commence on the advent of zero-phase-sequence transient line-energizing current;

(d) a transactor adapted to be coupled to the line to derive an A.-C. voltage the magnitude of which is representative of the magnitude of zero-phase-sequence line current of power frequency;

(e) a frequency compensating circuit connected to said transactor, whereby the magnitude of said derived voltage is similarly representative of the magnitude of zero-phase-sequence line current at frequencies higher than power frequency;

(f) second fault detecting means connected to said transactor for producing a second coordinating signal whenever the derived voltage magnitude exceeds a level corresponding to zero-phase-sequence line current magnitude of a predetermined second amount, said second amount being greater than said first amount; and (g) means connected to said directional sensing means, to said time delay means and to said second fault detecting means for developing an operating signal only in response to the contemporaneous production of said control signal and either one of said first and second coordinating signals.

20. A directional comparison protective relay system for initiating a predetermined control function in response to the occurrence of a ground fault on a polyphase A.-C. electric power transmission line having distantly spaced terminals at each of which are located signal transmitting and receiving means so arranged that the transmitting means at each terminal can communicate with the receiving means at any of said terminals remote therefrom, comprising at each of the line terminals:

(a) first ground fault responsive means adapted to be coupled to the line and to the local transmitting means, said first fault responsive means being operative to activate said transmitting means in response to the magnitude of the zero-phase-sequence component of line current exceeding a predetermined first amount;

(b) ground current directional discriminating means adapted to be coupled to the line for operation in response to zero-phase-sequence line current flowing toward a ground fault located on the protected-line side of the local terminal;

(c) first control means adapted to connect said discriminating means to the local transmitting means for deactivating said transmitting means in response to operation of said discriminating means;

(d) frequency checking means adapted to be coupled to the line and connected to said first fault responsive means, said frequency checking means being responsive to zero-phase-sequence line current of power frequency and unresponsive to the zero-phase-sequence component of the higher frequency transient line-energizing current for producing a first coordinating signal following operation of said first fault responsive means, said first coordinating signal not being produced under line-energizing conditions;

(e) second ground fault responsive means adapted to be coupled to the line for producing a second coordinating signal in response to the magnitude of zero-phase-sequence line current exceeding a predetermined second amount which is greater than said first amount;

(f) means connected to said discriminating means, to said frequency checking means and to said second fault responsive means for producing a first operating signal in response to operation of said discriminating means and the production of either one of said first and second coordinating signals;

(g) third ground fault responsive means adapted to be coupled to the line for producing a second operating signal in response to the magnitude of zero-phase-sequence line current exceeding a predetermined third amount which is greater than said first amount but less than said second amount; and (h) second control means supplied by said first and second operating signals and responsive to their contemporaneous presence for effecting initiation of the predetermined control function, said second control means additionally being adapted to be connected to the local receiving means and being so arranged as to be rendered ineffective to initiate said control function whenever an active remote transmitting means is communicating with said receiving means.

21. In a ground fault responsive protective relaying arrangement for a polyphase A.-C. electric power transmission line:

(a) directional sensing means adapted to be coupled to the line for operation in response to the zero-phase-sequence component of line current flowing in a direction toward a ground fault on the protected line;

(b) frequency checking means adapted to be coupled to the line for operation in response to a zero-phase-sequence line current half cycle of predetermined polarity persisting for at least a predetermined interval of time, said predetermined interval being longer than any half cycle of zero-phase-sequence transient line-energizing current; and (c) means connected to said directional sensing means and to said frequency checking means and responsive to their contemporaneous operations for initiating a predetermined control function.

References Cited by the Examiner
UNITED STATES PATENTS

| | | | |
|---|---|---|---|
| Re. 23,430 | 11/1951 | Warrington | 317—28 |
| 2,144,494 | 1/1939 | Harder | 317—28 |
| 2,831,126 | 4/1958 | Linvill et al. | 317—28 |
| 2,873,410 | 2/1959 | Hodges | 317—28 |
| 3,176,190 | 3/1965 | Hodges | 317—28 |

MILTON O. HIRSHFIELD, *Primary Examiner.*

SAMUEL BERNSTEIN, *Examiner.*

R. V. LUPO, *Assistant Examiner.*